(12) United States Patent
Narikawa

(10) Patent No.: US 10,012,989 B2
(45) Date of Patent: Jul. 3, 2018

(54) AUTONOMOUS MOVEMENT DEVICE, AUTONOMOUS MOVEMENT METHOD AND NON-TRANSITORY RECORDING MEDIUM

(71) Applicant: CASIO COMPUTER CO., LTD., Shibuya-ku, Tokyo (JP)

(72) Inventor: Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/278,627

(22) Filed: Sep. 28, 2016

(65) Prior Publication Data
US 2017/0178331 A1 Jun. 22, 2017

(30) Foreign Application Priority Data

Dec. 17, 2015 (JP) .................................. 2015-246761

(51) Int. Cl.
*G06T 7/00* (2017.01)
*G05D 1/02* (2006.01)
(Continued)

(52) U.S. Cl.
CPC ............. *G05D 1/02* (2013.01); *G05D 1/0246* (2013.01); *G05D 1/0274* (2013.01);
(Continued)

(58) Field of Classification Search
CPC ............. G06K 9/00664; G06T 7/0044; G06T 2207/10016; H04N 5/23238
See application file for complete search history.

(56) References Cited

U.S. PATENT DOCUMENTS 6,466,866 B1   10/2002  Sato
9,714,841 B2    7/2017  Toda et al.
(Continued)

FOREIGN PATENT DOCUMENTS

JP      2004005593 A    1/2004
JP      2004276168 A   10/2004
(Continued)

OTHER PUBLICATIONS

Related U.S. Appl. No. 15/359,689, filed Nov. 23, 2016, First Named Inventor: Yasushi Maeno, Title: "Autonomous Movement Device, Autonomous Movement Method, and Non-Transitory Recording Medium".

(Continued)

*Primary Examiner* — Qian Yang
(74) *Attorney, Agent, or Firm* — Holtz, Holtz & Volek PC

(57) ABSTRACT

To increase the frequency of executing a loop closing process, and to reduce an accumulated error in a local device position, and the like. A rotational image picker of an autonomous movement device picks up an image while performing a rotational action. An image memory stores information on the picked-up image. A map memory stores a created map. A position estimator estimates the local device position. A similar image searcher searches, from the image memory, the image that has a similarity level of equal to or greater than a predetermined similarity level. A map corrector corrects the map stored in the map memory when the similar image searcher founds the image that has the similarity level of equal to or greater than the predetermined similarity level.

15 Claims, 15 Drawing Sheets

(51) Int. Cl.
*G06K 9/00* (2006.01)
*G06K 9/46* (2006.01)
*H04N 5/232* (2006.01)
*G06T 7/73* (2017.01)
*G06T 7/246* (2017.01)

(52) U.S. Cl.
CPC ....... *G06K 9/00664* (2013.01); *G06K 9/4633* (2013.01); *G06T 7/246* (2017.01); *G06T 7/74* (2017.01); *H04N 5/23238* (2013.01); *G06K 9/4671* (2013.01); *G06T 2207/10016* (2013.01); *G06T 2207/30244* (2013.01); *G06T 2207/30252* (2013.01)

(56) References Cited

U.S. PATENT DOCUMENTS

| | | | |
|---|---|---|---|
| 9,739,215 | B2 | 8/2017 | Martin et al. |
| 9,773,335 | B2 | 9/2017 | Koga |
| 2009/0096686 | A1 | 4/2009 | Niculescu et al. |
| 2011/0054689 | A1 | 3/2011 | Nielsen et al. |
| 2012/0230550 | A1 | 9/2012 | Kraut |
| 2012/0239191 | A1 | 9/2012 | Versteec et al. |
| 2013/0103405 | A1 | 4/2013 | Namba et al. |
| 2013/0138246 | A1 | 5/2013 | Gutmann et al. |
| 2014/0225919 | A1 | 8/2014 | Kaino et al. |
| 2015/0262361 | A1* | 9/2015 | Lo .................. G06F 3/0312 382/103 |
| 2016/0147230 | A1 | 5/2016 | Munich et al. |
| 2016/0180533 | A1* | 6/2016 | Pavani .............. G06K 9/00624 382/103 |
| 2016/0334885 | A1* | 11/2016 | Togawa ................ G06F 17/50 |
| 2017/0148167 | A1 | 5/2017 | Aratani |
| 2017/0174227 | A1 | 6/2017 | Tatourian et al. |

FOREIGN PATENT DOCUMENTS

| | | |
|---|---|---|
| JP | 2008059218 A | 3/2008 |
| JP | 2008071352 A | 3/2008 |
| JP | 2008090575 A | 4/2008 |
| JP | 2009169845 A | 7/2009 |
| JP | 2009193240 A | 8/2009 |
| JP | 2010288112 A | 12/2010 |
| JP | 2011048706 A | 3/2011 |
| JP | 2012216051 A | 11/2012 |
| JP | 2014186694 A | 10/2014 |
| JP | 2015146091 A | 8/2015 |

OTHER PUBLICATIONS

Tomokazu Sato, "Sequential Three-dimensional Reproduction from Motion Image by Feature Point Tracking, and Application Thereof, from Basics of Coordinate System to Application Case Examples and Recent Research Tendency", Image Sensing Symposium Tutorial.

Andrew J. Davison, "Real-Time Simultaneous Localisation and Mapping with a Single Camera", Proceedings of the 9th IEEE International Conference on Computer Vision vol. 2, 2003, pp. 1403-1410.

Richard Hartley, et al., "Multiple View Geometry in Computer Vision", Second Edition, Mar. 2004.

Related U.S. Appl. No. 15/269,917, filed Sep. 19, 2016, First Named Inventor: Tetsuro Narikawa, Title: "Autonomous Movement Device, Autonomous Movement Method and Non-Transitory Recording Medium".

Related U.S. Appl. No. 15/276,320, filed Sep. 26, 2016, First Named Inventor: Mitsuyasu Nakajima, Title: "Autonomous Movement Device, Autonomous Movement Method and Non-Transitory Recording Medium".

Japanese Office Action dated Oct. 24, 2017 in Japanese Application No. 2015-246761.

Benavidez, et al., "Cloud-based realtime robotic visual slam", InSystems Conference (SysCon), 2015 9th Annual IEEE International Apr. 13, 2015, pp. 773-777, IEEE.

Oezuysal, et al., "Fast Keypoint Recognition using Random Ferns", https://cvlab.epfl.ch/files/content/sites/cvlab2/files/publications/publications/2010/OzuysalCLF10.pdf (Year: 2010).

Riisgaard, et al., "SLAM for Dummies", As accessed by the WayBackMachine.org, (first published on Nov. 8, 2010).

* cited by examiner

○ KEY FRAME POSITION (GRAPH POINT)

---- LINE INTERCONNECTING KEY FRAMES HAVING RELATIVE POSITIONAL
RELATIONSHIP DIRECTLY CALCULATABLE (GRAPH LINE)

↗ MOVEMENT TRAJECTORY FROM KEY FRAME TO NEXT KEY FRAME

FIG. 13          Prior Art

⊕ ⊗ SINCE BOTH POSITION AND IMAGE-PICKUP DIRECTION
⊘ ● ARE BOTH NEAR AND SIMILAR AT HATCHED POINT
INDICATED AT LEFT, KEY FRAME INCLUDING A LARGE
NUMBER OF CONSISTENT FEATURE POINTS IS
OBTAINABLE, ENABLING LOOP CLOSING.

AUTONOMOUS MOVEMENT DEVICE, AUTONOMOUS MOVEMENT METHOD AND NON-TRANSITORY RECORDING MEDIUM

CROSS-REFERENCE TO RELATED APPLICATION

This application claims the benefit of Japanese Patent Application No. 2015-246761, filed on Dec. 17, 2015, the entire disclosure of which is incorporated by reference herein.

FIELD

This application relates generally to an autonomous movement device, an autonomous movement method, and a non-transitory recording medium.

BACKGROUND

Autonomous movement devices that autonomously move in accordance with an application are becoming popular. For example, autonomous movement devices that autonomously move for the purpose of indoor space cleaning are known. In general, as for such autonomous movement devices, creation of a map in an actual space and estimation of the local device position in the real space are necessary.

As for the scheme of creating a map in the actual space, for example, a Simultaneous Localization And Mapping (SLAM) scheme has been known. The basic principle of the SLAM technology using a monocular camera is disclosed in Non Patent Literature 1, and by tracking the same feature point from the multiple frames of a motion image picked up by the camera, a process of alternately estimating the three-dimensional position of the local device (camera position) and the three-dimensional position of the feature point (this is collected up to form map information) is executed.

According to this scheme, the local device position and the three-dimensional position of the feature point are alternately estimated, an error accumulation occurs. Hence, when an autonomous movement device performs a looped movement and the like, and returns to the former position, the autonomous movement device may be unable to recognize the return to the former position. As for the scheme of correcting such an accumulated error, a loop closing process (a loop solution process) is known which is applied in, for example, Patent Literature 1. When the local device detects a loop (when the same feature point as the feature point picked up at the same position in past is detected from the picked-up frame), the autonomous movement device determines the past position as a proper position, and executes the loop closing process of correcting the position on a route from the proper position to the present position.

Non Patent Literature 1 Andrew J. Davison, "Real-Time Simultaneous Localization and Mapping with a Single Camera", Proceedings of the 9th IEEE International Conference on Computer Vision Volume 2, 2003, pp. 1403-1410

Non Patent Literature 2 Richard Hartley, Andrew Zisserman, "Multiple View Geometry in Computer Vision", Second Edition, Cambridge University Press, March 2004, chapter 9

Patent Literature 1 Unexamined Japanese Patent Application Kokai Publication No. 2004-276168

SUMMARY

The autonomous movement device of the present disclosure includes:

an image picker;
a driver;
a controller; and
a memory,
in which:

the memory stores information on an image picked up by the image picker associated with information on a position of a local device when the image is picked up, and a map created using the information on the plurality of stored images; and the controller causes the image picker to pick up the image while causing the driver to rotate the local device, searches the image that has a similarity level to the picked-up image equal to or greater than a predetermined similarity level from the memory, and corrects the map stored in the memory based on, when the image that has the similarity level of equal to or greater than the predetermined similarity level is found, information on the position corresponding to the found image.

BRIEF DESCRIPTION OF THE DRAWINGS

A more complete understanding of this application can be obtained when the following detailed description is considered in conjunction with the following drawings, in which.

DETAILED DESCRIPTION

Figure 1:
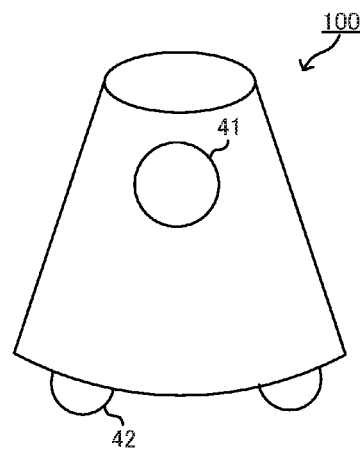
FIG. 1 is a diagram illustrating an external appearance of an autonomous movement device according to a first embodiment.

An explanation will be given of an autonomous movement device according to an embodiment of the present disclosure. An autonomous movement device 100 autonomously moves in accordance with an application. Example applications are security and monitoring, indoor cleaning, pet up-keeping, and plaything.

The autonomous movement device 100 includes, as an external appearance, an image picker 41 and a driver 42.

The image picker 41 includes a monocular imaging device (camera). The image picker 41 obtains an image (frame) at, for example, 30 fps. The autonomous movement device 100 performs autonomous movement while recognizing the local device position and the surrounding environment in a real-time manner based on the images sequentially obtained by the image picker 41.

The driver 42 is a moving device which is an independent two-wheel drive type, and which includes wheels and a motor. The autonomous movement device 100 is capable of parallel movement (translation movement) in the back-and-forth direction by the two wheels driven in the same direction, of rotating (direction change) at the present location by the two wheels driven in the opposite directions, and of turning (translation movement+rotation (direction change) movement) by the two wheels driven at respective speeds changed differently. In addition, each wheel is provided with a rotary encoder which measures the number of rotations of the wheel, and is capable of calculating a translation movement amount and a rotation amount by utilizing a geometric relationship, such as the diameter of the wheel, the distance between the wheels, and the like. When, for example, the diameter of the wheel is D, and the number of rotations is R (which is measured by the rotary encoder), the translation movement amount of this wheel at the floor contacting part can be defined as $\pi \times D \times R$. In addition, when the diameter of the wheel is D, the distance between the wheels is I, the number of rotations by the right wheel is $R_R$, and the number of rotations by the left wheel is $R_L$, the rotation amount for direction change can be defined as (when a clockwise rotation is defined as a positive rotation) $360 \text{ degrees} \times D \times (R_L - R_R)/(2 \times I)$. By accumulating those translation movement amount and rotation amount in sequence, the driver 42 functions as a so-called odometry which is capable of measuring the local device position (the position and the direction with reference to the position and the direction at the start of movement).

The precision of the local device position obtained from the odometry and that of the direction therefrom are often reduced due to the friction of the wheel, a slip, and the like. In particular, since the error is being accumulated, the precision decreases as time advances.

Note that crawlers may be applied instead of the wheels, and a movement may be made by multiple (for example, two) walking legs. In those cases, like the case of the wheels, the local device position and the direction are measurable based on the movement of the two crawlers and that of the legs.

Figure 2:
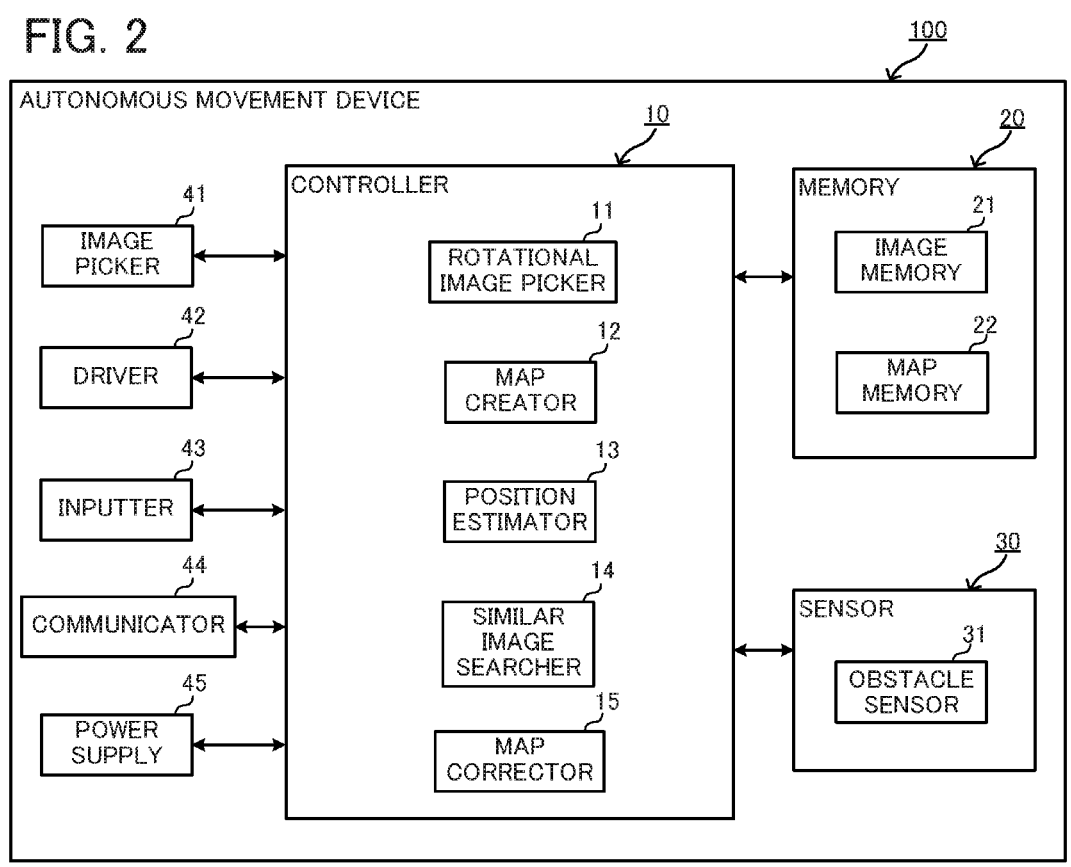
FIG. 2 is a diagram illustrating a structure of the autonomous movement device according to the first embodiment.

As illustrated in FIG. 2, the autonomous movement device 100 includes, in addition to the image picker 41 and the driver 42, a controller 10, a memory 20, a sensor 30, an inputter 43, a communicator 44, and a power supply 45.

The controller 10 includes a Central Processing Unit (CPU) and the like, executes a program stored in the memory 20, thereby accomplishing the functions of respective components (a rotational image picker 11, a map creator 12, a position estimator 13, a similar image searcher 14, and a map corrector 15) to be explained later.

The memory 20 includes a Read Only Memory (ROM), a Random Access Memory (RAM), and the like, and includes an image memory 21 and a map memory 22. The ROM stores programs (for example, programs relating to calculation by an SLAM scheme to be explained later and autonomous movement control process) to be executed by the CPU of the controller 10, and necessary data in order to execute the programs. The RAM stores data to be created and changed during the execution of the programs.

The image memory 21 stores images picked up by the image picker 41. However, in order to save the memory capacity efficiently, only some of the picked up images may be stored, or a feature quantity of the image may be stored instead of the image itself. As for the important image (a key frame to be explained later), the image memory 21 stores information on the important image picked up by the image picker 41 associated with information on the local device position (the position of the local device and the direction thereof) when the image is picked up.

The map memory 22 stores a map (information on the three-dimensional position of a feature point and that of an obstacle) created by the map creator 12 based on the SLAM scheme to be explained later and information from an obstacle sensor 31.

The sensor 30 includes an obstacle sensor 31. The obstacle sensor 31 detects an obstacle while the autonomous movement device 100 is moving, and is, for example, an infrared sensor or an ultrasound sensor. Note that the obstacle may be detected using the image picker 41 instead of applying the individual obstacle sensor 31. In addition, an unillustrated bumper sensor that detects a collision with other objects may be applied.

Operation buttons that are the inputter 43 to operate the autonomous movement device 100 are provided. The operation buttons include, for example, a power button, a mode change button (to change the modes, such as a cleaning mode and a pet mode), and an initialize button (to start over map creation). As the inputter 43, an unillustrated microphone to input sound, and a sound recognizer that recognizes the speech operation instruction to the autonomous movement device 100 may be provided.

The communicator 44 is a module for a communication with an external device, and is a wireless module including an antenna when a wireless communication with the external device is performed. An example communicator 44 is a wireless module for a short-range wireless communication based on the Bluetooth (Registered Trademark). The communicator 44 exchanges data between the autonomous movement device 100 and the external device.

The power supply 45 is a source of power to actuate the autonomous movement device 100, and in general, is built-in rechargeable batteries, but may be solar batteries or a system to which power is wirelessly supplied from the floor surface. When the power supply 45 is rechargeable batteries, charging is performed by a charging station (home base) with which the autonomous movement device 100 is docked.

Next, functions of the controller 10 will be explained. The controller 10 includes the rotational image picker 11, the map creator 12, the position estimator 13, the similar image searcher 14, and the map corrector 15, and performs an arithmetic operation by the SLAM scheme to be explained later, a movement instruction to the autonomous movement device 100, and the like. In addition, the controller 10 is compatible with a multi-thread function, and is capable of simultaneously executing multiple threads (different process flows).

The rotational image picker 11 causes the image picker 41 to pick up an image while causing the driver 42 to rotate the local device based on a predetermined condition, and stores the picked-up image in the image memory 21 associated with information on the position of the local device and the direction thereof both estimated by the position estimator 13 to be explained later. As for the local device position and direction, a value obtained from the above explained odometry may be applied instead of the estimated value by the position estimator 13.

The map creator 12 stores, in the map memory 22 as map information, a three-dimensional position (Map point) of a feature point estimated by the SLAM scheme based on information on the image stored in the image memory 21 and information on the local device position and the direction when the image is picked up, and a three-dimensional position of an obstacle obtained based on information on the local device position and the direction when the obstacle sensor 31 detects the obstacle.

The position estimator 13 estimates, as a visual odometry, the local device position and the direction based on the SLAM scheme to be explained later.

The similar image searcher 14 compares the feature quantity of the image picked up by the image picker 41 with the feature quantity of the image stored in the image memory 21, and searches the image that has a similarity level which is equal to or greater than a predetermined similarity level (reference similarity level).

The map corrector 15 corrects the map information stored in the map memory 22 based on the information on the position at which an image is picked up and the direction thereof when the similar image searcher 14 founds the image with a similarity level that is equal to or greater than the reference similarity level.

Figure 3:
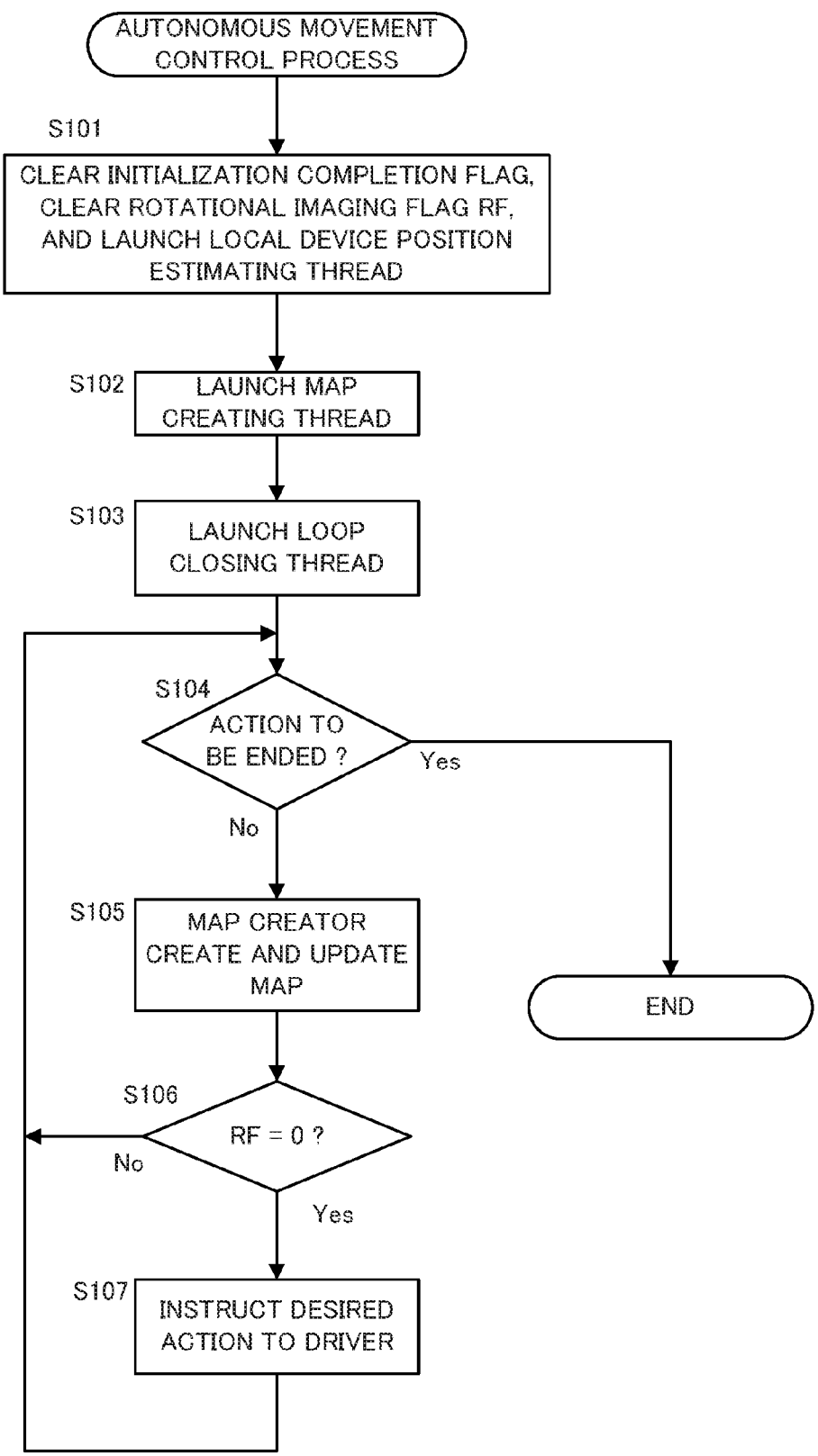
FIG. 3 is a flowchart for an entire autonomous movement control process according to the first embodiment.

FIG. 3 is a main flow for the autonomous movement device 100. First, the controller 10 clears out an initialization completion flag (a variable that indicates whether or not an initializing process for the local device position estimation has completed) and a rotational imaging flag (a variable whether or not a rotational imaging process is in execution, hereinafter, also referred to as an "RF"), launches (step S101) a local device position estimating thread, and then launches respective threads that are a map creating thread (step S102), and a loop closing thread (step S103). By launching the local device position estimating thread, and the map creating thread, the creation of the map information and the visual odometry (information on the local device position estimated based on the map and the image) by the SLAM scheme starts. Next, the controller 10 determines (step S104) whether or not to end the action, and when the action is to be ended (step S104: YES), the controller 10 ends the action, and when the action is not to be ended (step S104: NO), the map creator 12 creates and updates (step S105) the map information.

Subsequently, the controller 10 determines (step S106) whether or not the rotational imaging flag RF is 0. The rotational imaging flag RF is a flag that represents the status of the rotational imaging process which is a feature of this embodiment, the value 0 indicates "the rotational imaging process not in execution", the value 1 indicates "the rotational imaging process in execution (a stage prior to a rotation), and the value 2 indicates "the final stage of the rotational imaging process". When RF is 0 (step S106: YES), the process progresses to step S107, a desired action is instructed (step S107) to the driver 42 for an autonomous movement, and the process returns to the step S104. When RF is not 0 (step S106: NO), this means that the rotational imaging process is in execution, in order to accomplish the movement process through the rotational imaging process, the movement process in the main flow is not executed, and the process returns to the step S104. Note that the detail of the rotational imaging process will be explained later.

By the process through the main flow, the autonomous movement device 100 is capable of autonomously moving based on the map information, and updating the map information as appropriate. As a typical example, first, when the power supply 45 is activated with the autonomous movement device 100 being located at the charging station, the autonomous movement device 100 moves each room of a housing entirely with the aid of the obstacle sensor 31, specifies the position of an obstacle like a wall by the obstacle sensor 31, and creates the map information containing the position of the obstacle. When the map is created to some level, an area which has the map information not created yet but which can be estimated as a movable area for the autonomous movement device 100 becomes apparent. Hence, the autonomous movement device 100 may autonomously move to this area to create the map of a further wide range. Next, when map information on substantially all movable ranges for the autonomous movement device 100 is created, the autonomous movement device 100 is enabled to efficiently move based on the map information. For example, the autonomous movement device 100 becomes able to return to the charging station with the shortest route from any position in any room, and to clean the room efficiently.

Figure 4:
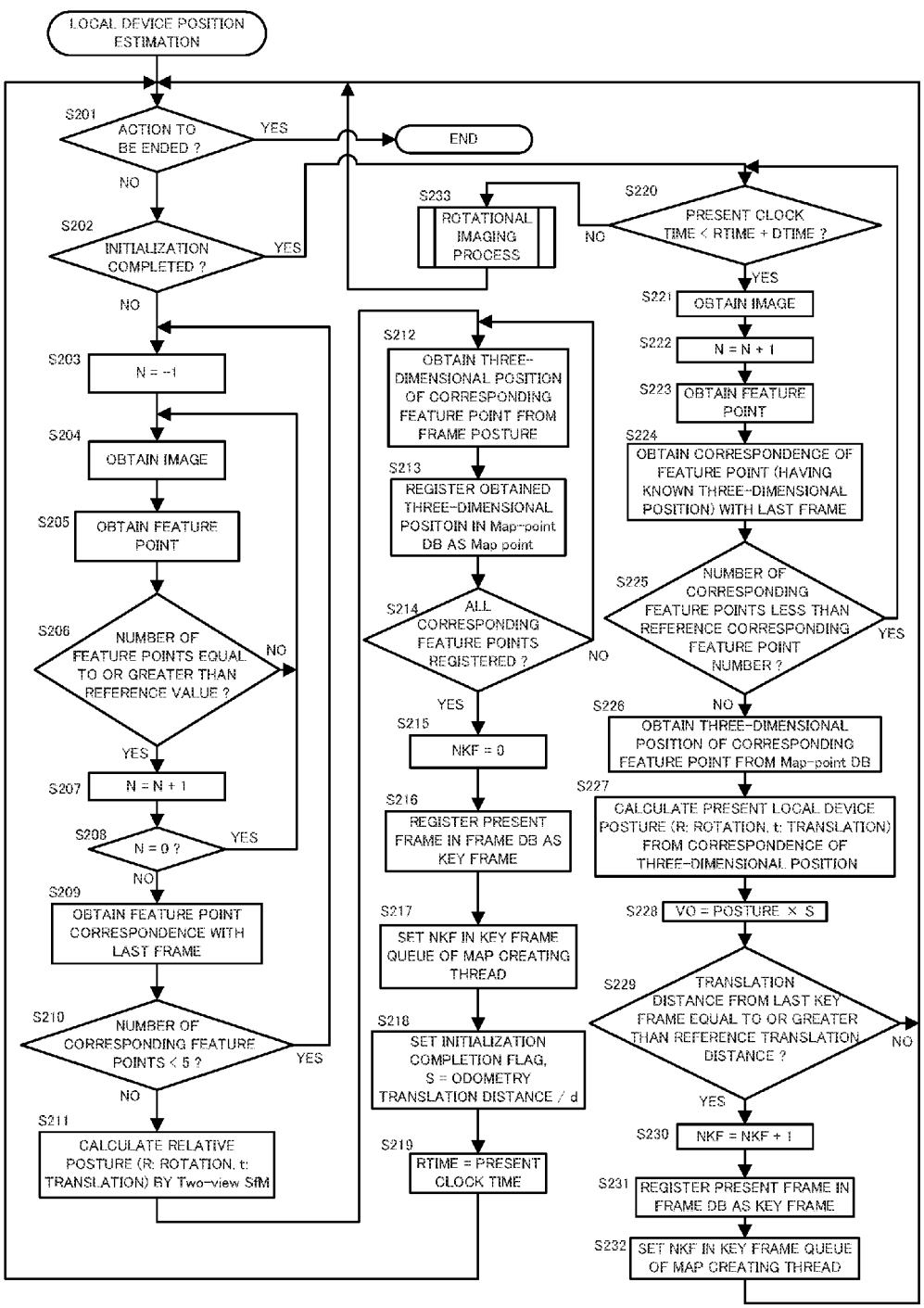
FIG. 4 is a flowchart for a process in a local device position estimating thread of the autonomous movement control process according to the first embodiment.

The local device position estimating thread launched in the step S101 in the main flow (see FIG. 3) for the autonomous movement device 100 will be explained with reference to FIG. 4. This thread is a process of causing the position estimator 13 to execute an initializing process at first, and then continuing the local device position estimation (the local device position is estimated by the visual odometry using the image obtained by the image picker 41).

First, the position estimator 13 determines (step S201) whether or not to end the action. When the action is to be ended (step S201: YES), the action is ended, and when the action is not to be ended (step S201: No), the position estimator 13 determines (step S202) whether or not the initialization has been already made. When the initialization has been already made (step S202: YES), the local device position estimating process subsequent to step S220 is executed, and when the initialization has not been made yet (step S202: NO), the process progresses to step S203, and an initializing process is executed. First, an explanation will be given of the initializing process.

In the initializing process, first, the position estimator 13 sets (step S203) a frame counter N to be −1, and the image picker 41 picks up (step S204) the image. The image can be picked up at, for example, 30 fps (the obtained image is also called a frame). Next, a two-dimensional feature point is obtained (step S205) from the obtained image. The two-dimensional feature point is a portion which has a feature in the image, such as an edge within the image, and is obtainable by algorithms, such as a Scale-Invariant Future Transform (SIFT) and a Speed-Up Robust Features (SURF). Note that other algorithms are also applicable to obtain the two-dimensional feature point.

When the number of obtained two-dimensional feature points is small, a calculation based on a Two-view Structure from Motion scheme to be explained later is not executable, and thus the position estimator 13 compares, in step S206, the number of obtained two-dimensional feature points with a reference value (for example, 10). When the number of obtained two-dimensional feature points is less than the reference value (step S206: NO), the position estimator 13 returns the process to the step S204, and the obtainment of the image and the obtainment of the two-dimensional feature point are repeated until the number of obtained two-dimensional feature points becomes equal to or greater than the reference value. At this stage, although the map information has not been created yet, for example, in the above-explained typical case, the autonomous movement device 100 has started moving each rooms of the housing entirely with the aid of the obstacle sensor 31. Accordingly, when the obtainment of the image and the obtainment of two-dimensional feature point are repeated in this initializing process, the image obtainment is repeated while the autonomous movement device 100 is moving. Hence, various images are obtainable, and image obtainment with a large number of two-dimensional feature points in future is expected.

When the number of obtained two-dimensional feature points is equal to or greater than the reference value (step S206: YES), the position estimator 13 increments (step S207) the frame counter N. Next, the position estimator 13 determines (step S208) whether or not the frame counter N is zero. When the frame counter N is zero (step S208: YES), this means that only a single image has been obtained, and thus the position estimator 13 returns the process to the step S204 in order to obtain the second image. Although not illustrated in the flowchart that is FIG. 4, when the local device position at the time of the obtainment of the first image and the local device position at the time of the obtainment of the second image are apart from each other to some level, the precision for a posture estimation in the subsequent process improves. Hence, when the process returns from the step S208 to the step S204, a stand-by process until the translation distance by the odometry in accordance with an action instruction to the driver 42 in the step S107 in the main flow (see FIG. 3) becomes equal to or greater than a predetermined distance (for example, 1 m) may be added.

When the frame counter N is not zero (step S208: NO), this indicates that the two images have been already obtained, and the position estimator 13 obtains (step S209) the correspondence of the two-dimensional feature point between the two images (the consistent point in the actual environment is present in the respective images, and the correspondence is obtainable). When the number of corresponding feature points is less than five, the posture estimation between the two images to be explained later is not executable, and thus the position estimator 13 determines (step S210) whether or not the number of corresponding feature points is less than five. When the number of corresponding feature points is less than five (step S210: YES), in order to start over the obtainment of the initial image, the process returns to the step S203. When the number of corresponding feature points is equal to or greater than five (step S210: NO), the posture between the two images (the difference between the positions where the respective images are obtained (translation vector t) and the difference in directions (rotation matrix R)) are estimatable (step S211) by the Two-view Structure from Motion scheme.

As for this estimation, more specifically, a basic matrix E is obtained from the corresponding feature points, and the basic matrix E is decomposed into the translation vector t and the rotation matrix R to obtain the estimation, but the details are disclosed in Non Patent Literature 2. Hence, the detailed explanation will be omitted in this specification. The value of each element in the translation vector t to be obtained in this case (when a movement in the three-dimensional space is expected, with the position where the first image is obtained being as an origin, three elements that are X, Y, Z are present) differs from the value in the actual environment (according to the Two-view Structure from Motion scheme, the value in the actual environment itself is not obtainable, and a value in a similar space to the actual environment is to be obtained). Hence, such a value is considered as the value in the SLAM space, and the following explanation will be given with reference to the coordinates in the SLAM space (SLAM coordinate system).

When the posture (the translation vector t and the rotation matrix R) between the two images is obtained, the value thereof indicates the posture of the second image (the local device position (translation vector t) and the direction (rotation matrix R) when the second image is obtained) with reference to the first image (the position where the first image is obtained is defined as the origin of the SLAM coordinate system, the translation vector is zero vector, and the rotation matrix is a unit matrix I). In this case, when the postures of the respective two images (the local device position (translation vector t) and the direction (rotation matrix R) when the image (frame) is obtained, also referred to as a frame posture) have been obtained, the map creator 12 obtains (step S212) a three-dimensional position in the SLAM coordinate system of the two-dimensional feature point (corresponding feature point) that has the correspondence between those images based on the following attitude.

When the coordinates (frame coordinates, already known) of the two-dimensional feature point in the image are (u, v), and the three-dimensional position (unknown) of such a two-dimensional feature point in the SLAM coordinate system is (X, Y, Z), the relationship when those are expressed by the homogeneous coordinates can be expressed as the following formula (1) using a perspective projection matrix P. In this case, the symbol [~] means "equal except a constant multiplication other than zero" (that is, equal or multiple by a constant number (not zero)), and the symbol ['] means "transposition".

$$(uv1)' \sim P(XYZ1)' \qquad (1)$$

In the above formula (1), P is a matrix of three by four, and can be expressed as the following formula (2) by a three-by-three matrix A and external parameters R and t indicating the posture of the image (the frame posture). In this case, (R|t) represents a matrix that arranges the translation column vector t at the right side of the rotation matrix R.

$$P = A(R|t) \qquad (2)$$

In the above formula (2), R and t are obtained as the frame posture as explained above. In addition, since an internal parameter A of the camera is defined by the focal point distance and the imaging element size, thus becoming a constant number when the image picker 41 has been chosen beforehand.

When one of the two-dimensional feature points that have the correspondence between the two images is present at frame coordinates $(u_1, v_1)$ in the first image and at frame coordinates $(u_2, v_2)$ in the second image, the following formula (3) and formula (4) are satisfied. In this case, I is a unit matrix, 0 is a zero vector, and (L|r) is a matrix that arranges the column vector r at the right side of the matrix L.

$$(u_1 v_1 1)' \sim A(I|0)(XYZ1)' \quad (3)$$

$$(u_2 v_2 1)' \sim A(R|t)(XYZ1)' \quad (4)$$

In the above formula (3) and formula (4), since a formula can be made for each of $u_1$, $v_1$, $u_2$, and $v_2$, four formulae can be made, but since unknown values are three that are X, Y, and Z, those unknown values X, Y, and Z can be obtained, and those represent the three-dimensional position of the two-dimensional feature point in the SLAM coordinate system. Note that since the number of formulae is greater than the number of unknown values, for example, X, Y, and Z obtained based on $u_1$, $v_1$, $u_2$ may differ from X, Y, and Z obtained based on $u_1$, $v_1$, $v_2$. According to such a case, a simultaneous linear equation under an excessive condition is established, and in general, there is no solution, but the map creator 12 applies the least square scheme to obtain most probable X, Y, and Z.

When the three-dimensional position (X, Y, Z) of the two-dimensional feature point in the SLAM coordinate system is obtained, the map creator 12 registers (step S213) this position as a Map point in a Map-point database (also referred to as a Map-point DB (DataBase), stored in the map memory 22). As for the element to be registered in the Map-point database, at least "X, Y, Z that represent the three-dimensional position of the two-dimensional feature point in the SLAM coordinate system" and "the feature quantity of the two-dimensional feature point" (the feature quantity obtained by, for example, SIFT). In addition, when a "time stamp" (a value or the like of a key frame counter NKF (a variable indicating a present key frame number) when registered in the Map-point database) is added as the element to be registered in the Map-point database, edition (for example, recovery to the past condition) of the Map-point database becomes convenient.

Next, the map creator 12 determines (step S214) whether or not all two-dimensional feature points (corresponding feature points) that have the correspondence between the two images are registered in the Map-point database, and when all two-dimensional feature points are not registered yet (step S214: NO), the map creator 12 returns the process to the step S212, and when all two-dimensional feature points are registered (step S214: YES), the map creator 12 progresses the process to step S215.

Next, the position estimator 13 initializes (step S215) the NKF (a variable indicating the counter of a key frame (indicating the image to be processed in the subsequent thread)) to zero, and the second image is registered (step S216) as the key frame in a frame database (also referred to as a frame DB (DataBase), and stored in the image memory 21).

The elements to be registered in the frame database are a "key frame number" (the value of the key frame counter NKF at the time of registration), a "posture" (a local device position (translation vector t) in the SLAM coordinate system at the time of image-pickup and a direction (rotation matrix R)), "all extracted two-dimensional feature points", "points which have known three-dimensional positions as the respective Map points among all two-dimensional feature points", and a "feature of the key frame itself". In addition, a "posture in the actual environment measured by the odometry" (a local device position and a direction obtained based on the moved distance by the driver 42 in the actual environment) may also be registered.

In the above elements, the "feature of the key frame itself" is data to make the process of obtaining the image similarity level between the key frames efficient, and in general, the histogram of the two-dimensional feature point in the image is applicable, but the image itself may be taken as the "feature of the key frame itself". In addition, the "posture measured by the odometry in the actual environment" may be expressed by the translation vector t and the rotation matrix R, but in general, since the autonomous movement device 100 moves on the two-dimensional plane, such an element may be simplified to two-dimensional data, and may be expressed by two-dimensional coordinates (X, Y) and a direction $\phi$ with reference to the position (origin) at the time of the start of movement and the direction.

Next, in order to inform the map creating thread of a creation of the key frame, the position estimator 13 sets (step S217) the key frame counter NKF in the key frame queue (where queue employs a first-in and first-out data structure) of the map creating thread.

The initializing process of the local device position estimating thread completes through the above steps, and the position estimator 13 sets the initialization completion flag, and in order to obtain a scalar correspondence between the SLAM coordinates and the actual environment coordinates, the position estimator 13 divides the translation distance (obtained by the coordinates in the actual environment) by the odometry by a translation distance d in the SLAM coordinate system estimated through the above process, thereby obtaining a scale S (step S218).

Next, in order to actuate the rotational image picker 11 at fixed intervals, the controller 10 obtains the present clock time from an unillustrated timer, and sets (step S219) in RTIME (a variable to set a time at which the rotational imaging process starts). The process progresses to step S220 for a process when the initialization has completed, through the step S201 and the step S202.

An explanation will be given of the process when the initialization has completed. This process is the normal process in the local device position estimating thread, and is the process of causing the position estimator 13 to estimate the present local device position and the direction (the translation vector t in the SLAM coordinate system and the rotation matrix R) in sequence.

First, the controller 10 determines (step S220) whether or not the present clock time has elapsed by a predetermined time (DTIME, a variable for setting a time interval to execute the rotational imaging process, for example, 10 minutes) from RTIME (whether or not a condition to execute the rotational imaging process is satisfied). When the predetermined time has not elapsed (step S220: YES), the controller 10 progresses the process to step S221. Conversely, when the predetermined time has elapsed (step S220: NO), the controller 10 executes the rotational imaging process (step S233), and returns the process to the step S201.

When the present clock time has not elapsed from RTIME by the predetermined time (DTIME), the position estimator 13 causes the image picker 41 to pick up (step S221) an image, and increments (step S222) the frame counter N. Next, the two-dimensional feature point contained in the picked-up image is obtained (step S223). Subsequently, from the information on the past key frame (for example, an image that has the key frame number of NKF) registered in the frame database, the two-dimensional feature point that has the known three-dimensional position (the Map point registered in the Map-point database) among the two-dimensional feature points contained in the information on this image is obtained, and the two-dimensional feature point (the corresponding feature point) that has the correspondence with the presently picked-up image is extracted (step S224).

Next, the position estimator 13 determines (step S225) whether or not the number of corresponding feature points is less than the predetermined number (for example, 10, hereinafter, referred to as a "reference corresponding feature point number"). When the number of corresponding feature points is less than the reference corresponding feature point number (step S225: YES), the posture precision to be estimated by the SLAM scheme decreases, and thus the position estimator 13 returns the process to the step S220 without executing a position estimation. In this case, instead of immediate return to the step S220, the process may return to the step S224, and the key frame that has the number of corresponding feature points which is equal to or greater than the reference corresponding feature point number may be searched from the registered key frames in the frame database. In this case, when the key frame that has the number of corresponding feature points which is equal to or greater than the reference corresponding feature point number is not found among the registered key frames in the frame database, the process returns to the step S220.

When the corresponding feature points that are equal to or greater than the reference corresponding feature point number are extracted (step S225: NO), the position estimator 13 obtains (step S226) the three-dimensional position $(X_i, Y_i, Z_i)$ of each corresponding feature point from the Map-point database. When the frame coordinates of the corresponding feature point contained in the presently picked-up image are $(u_i, v_i)$, and the three-dimensional position of such a corresponding feature point is expressed as $(X_i, Y_i, Z_i)$ (where i is a value from 1 to the number of corresponding feature points), values $(ux_i, vx_i)$ obtained by projecting the three-dimensional position $(X_i, Y_i, Z_i)$ of each corresponding feature point in a frame coordinate system through the following formula (5) should be ideally consistent with the frame coordinates $(u_i, v_i)$.

$$(ux_i, vx_i, 1)' \sim A(R|t)(X_i Y_i Z_i 1)' \quad (5)$$

In practice, since $(X_i, Y_i, Z_i)$ and $(u_i, v_i)$ contain errors, $(ux_i, vx_i)$ is hardly consistent with $(u_i, v_i)$ in reality. In addition, although the unknown values are R and t only (in a three-dimensional space, each becomes three-dimensional, and the number of unknown values is 3+3=6), the number of the formulae is twice as much as the number of corresponding feature points (this is because there is a corresponding formula to each of u, v in the frame coordinates per a corresponding feature point), a simultaneous linear equation under the excessive condition is established, and thus the solution should be obtained by the least square scheme as explained above. More specifically, the position estimator 13 is to obtain the posture (the translation vector t and the rotation matrix R) that minimizes a cost function E1 expressed by the following formula (6). This becomes the local device posture (the local device position and the direction expressed by the translation vector t and the rotation matrix R, respectively) in the SLAM coordinate system obtained by the SLAM scheme. The position estimator 13 estimates (step S227) the posture of the local device in this way.

[Formula 1]

$$E1 = \sum_{i=1}^{\text{Number of corresponding feature points}} ((u_i - ux_i)^2 + (v_i + vx_i)^2) \quad (6)$$

Since the present posture of the local device (the translation vector t and the rotation matrix R) in the SLAM coordinate system has been obtained, the position estimator 13 multiplies such a posture by the scale S, thereby obtaining (step S228) a Visual Odometry (VO). The VO is utilizable as the local device position and the direction in the actual environment.

Next, the position estimator 13 determines (step S229) whether or not the local device has moved by equal to or greater than the predetermined distance (for example, 1 m, hereinafter, referred to as a "reference translation distance") from the local device position when the last key frame (the image that has the key frame number of NKF) registered in the frame DB, and when the local device has moved by equal to or greater than the reference translation distance (step S229: YES), the position estimator 13 increments (step S230) the key frame counter NKF, and then registers (step S231) the present frame as the key frame in the frame DB. When the local device has moved by less than the reference translation distance (step S229: NO), the position estimator 13 returns the process to the step S201.

In this case, the moved distance of the local device to be compared with the reference translation distance may be a translation distance (an absolute vector value (square root of sum of squares of the element) that is a difference in the translation vector between both frames) from the last frame to the present frame obtained by the odometry, or may be obtained by the VO (Visual Odometry) as explained above. The details to be registered in the frame DB are the "key frame number", the "posture", "all extracted two-dimensional feature points", the "two-dimensional feature points that have known three-dimensional position as the Map points among all two-dimensional feature points", and the "feature of the key frame itself" as explained above.

Subsequently, in order to inform the map creating thread of the creation of the new key frame, the position estimator 13 sets (step S232) the key frame counter NFK in the key frame queue of the map creating thread. Next, the position estimator 13 returns the process to the step S201. Note that the key frame counter NKF, the scale S, the Map-point DB, and the frame DB are stored in the memory 20 in such a way that the respective values are also referable in other threads.

Next, an explanation will be given of the map creating thread launched in the step S102 of the main flow (see FIG. 3) for the autonomous movement device 100 with reference to FIG. 5. In this thread, the map creator 12 calculates the three-dimensional position of the corresponding feature point in the key frame, and creates the map information (Map-point DB).

First, the map creator 12 determines (step S301) whether or not to end the action (step S301). When the action is to be ended (step S301: YES), the action is ended, and when the action is not to be ended (step S301: NO), the map creator 12 determines (step S302) whether or not the key frame queue is empty. When the key frame queue is empty (step S302: YES), the map creator 12 returns the process to the step S301, and when the key frame queue is not empty (step S302: NO), the map creator 12 takes out data from the key frame queue and sets (step S303) to the MKF (a variable indicating the key frame number of the key frame to be processed in the map creating thread). The map creator 12 determines (step S304) whether or not the MKF is zero, and when the MKF is zero (step S304: NO), the map creator 12 returns the process to the step S301, and waits for until the data is entered in the key frame queue. When the MKF is equal to or greater than 1 (step S304: YES), the process progresses to the following process.

The map creator 12 refers to the frame DB, and extracts (step S305) the two-dimensional feature point (the corresponding feature point) that has the correspondence between the previous frame (the key frame that has the key frame number of MKF−1) and the present key frame (the key frame that has the key frame number of MKF). Since the postures (the translation vectors t and the rotation matrices R) of the respective key frames are also registered in the frame DB, the three-dimensional position of the corresponding feature point is calculatable by the same process at the time of the initializing process in the local device position estimating thread. The map creator 12 registers (step S306) the corresponding feature point which has the calculated three-dimensional position in the Map-point DB as the Map point. The map creator 12 also registers (step S307), in the frame DB, the three-dimensional position for the two-dimensional feature point that has the calculated three-dimensional position at this time.

Note that when the extracted corresponding feature point by the map creator 12 has been already registered in the Map-point DB, the three-dimensional position calculation may be skipped and the process for the next corresponding feature point (which is not registered in the Map-point DB yet), or a three-dimensional position calculation may be executed again, and the three-dimensional position already registered in the Map-point DB or the three-dimensional position of the corresponding feature point in the frame DB may be updated.

Next, the map creator 12 determines (step S308) whether or not the key frame queue is empty. When the key frame queue is empty (step S308: YES), a bundle adjustment process is performed on the postures of all key frames and the three-dimensional positions of all Map points so as to improve the precision (step S309), and the map creator 12 returns the process to the step S310. When the key frame queue is not empty (step S308: NO), the process progresses to the step S310. Subsequently, the map creator 12 sets (step S310) the MKF in the key frame queue of the loop closing thread, and returns the process to the step S301.

Note that the bundle adjustment process is a non-linear optimization scheme that simultaneously estimates both the camera posture (the key frame posture) and the three-dimensional position of the Map point, and performs an optimization so as to minimize an error produced when the Map point is projected on the key frame.

By executing this bundle adjustment process, the precision of the key frame posture and that of the three-dimensional position of the Map point are improved. When, however, this process is not executed, simply improvement of the precision is not accomplished, which does not bring any technical problem. Hence, execution of this process is not always necessary every time there is no other process (when, for example, the key frame queue is empty).

In addition, by executing the bundle adjustment process, a Map point that has a larger error than the predetermined value when projected on the key frame may be found. Such a Map point with a large error affects the SLAM estimation. Hence, this Map point may be deleted from the Map-point DB and the frame DB or a flag to identify that this Map point has a large error and needs an attention may be set up. Note that the bundle adjustment process is optional according to this embodiment, and thus the explanation for the process detail will be omitted in this specification.

Next, an explanation will be given of the loop closing thread launched in the step S103 in the main flow (see FIG. 3) for the autonomous movement device 100 with reference to FIG. 6. In this thread, the controller 10 keeps checking whether or not the loop closing process is executable, and executes the loop closing process when determining as executable. Note that the loop closing process is to correct, based on a difference between the posture value when reached this site last time and the present posture value, the key frame being tracked up to the present time after reached this site last time and the three-dimensional position of the relevant Map point when the controller 10 recognized that the local device has returned to the site where the local device once reached in past.

First, the controller 10 determines (step S401) whether or not to end the action. When the action is to be ended (step S401: YES), the action is ended. When the action is not to be ended (step S401: NO), the controller 10 determines whether or not the key frame queue is empty (step S402). When the key frame queue is empty (step S402: YES), the controller 10 returns the process to the step S401, and when the key frame queue is not empty (step S402: NO), the controller 10 takes out data from the key frame queue, and sets (step S403) in an LKF (a variable indicating the key frame number of the key frame to be processed in the loop closing thread). Next, the controller 10 determines (step S404) whether or not the LKF is greater than 1. When the LKF is zero or 1 (step S404: NO), the controller 10 returns the process to the step S401, and waits for until the data is entered in the key frame queue. Next, when the LKF is equal to or greater than 2 (step S404: YES), the following process is executed.

The similar image searcher 14 refers to the frame DB, and searches (step S405), from the frame DB, the key frame that has a similarity level which is of the "feature of the key frame itself" relative to the present key frame (the key frame that has the key frame number of LKF), and which is equal to or greater than a predetermined similarity level (for example, 0.9, hereinafter, referred to as the "reference image similarity level"). In this case, when the feature of the image (the key frame) is represented by the feature vector, the similarity level may be the inner product of the absolute values (square root of sum of squares of the element) of the respective feature vectors of the two images normalized to 1. In addition, the inverse number of the distance (square root of sum of squares) of the feature vectors (the absolute value normalized to 1) of the two images may be adopted as the similarity level.

The controller 10 determines (step S406) whether or not the key frame that has the similarity level of the "feature of the key frame itself" which is equal to or greater than the reference image similarity level. When no such a frame is found (step S406: NO), the process returns to the step S401, and when such a frame is found (step S406: YES), the key frame posture being tracked from the found key frame to the present key frame, and the three-dimensional position of the Map point in the key frame being tracked are corrected (step S407) by the map corrector 15. For example, the map corrector 15 corrects the posture of the present key frame to the posture of the found key frame. Next, using a difference between the posture of the found key frame and that of the present key frame, the posture of each key frame being tracked from the found key frame and up to the present key frame is corrected linearly. In addition, the three-dimensional position of the Map point contained in each key frame is also corrected in accordance with the correction amount of the posture of each key frame.

Next, the controller 10 returns the process to the step S401.

Figure 7:
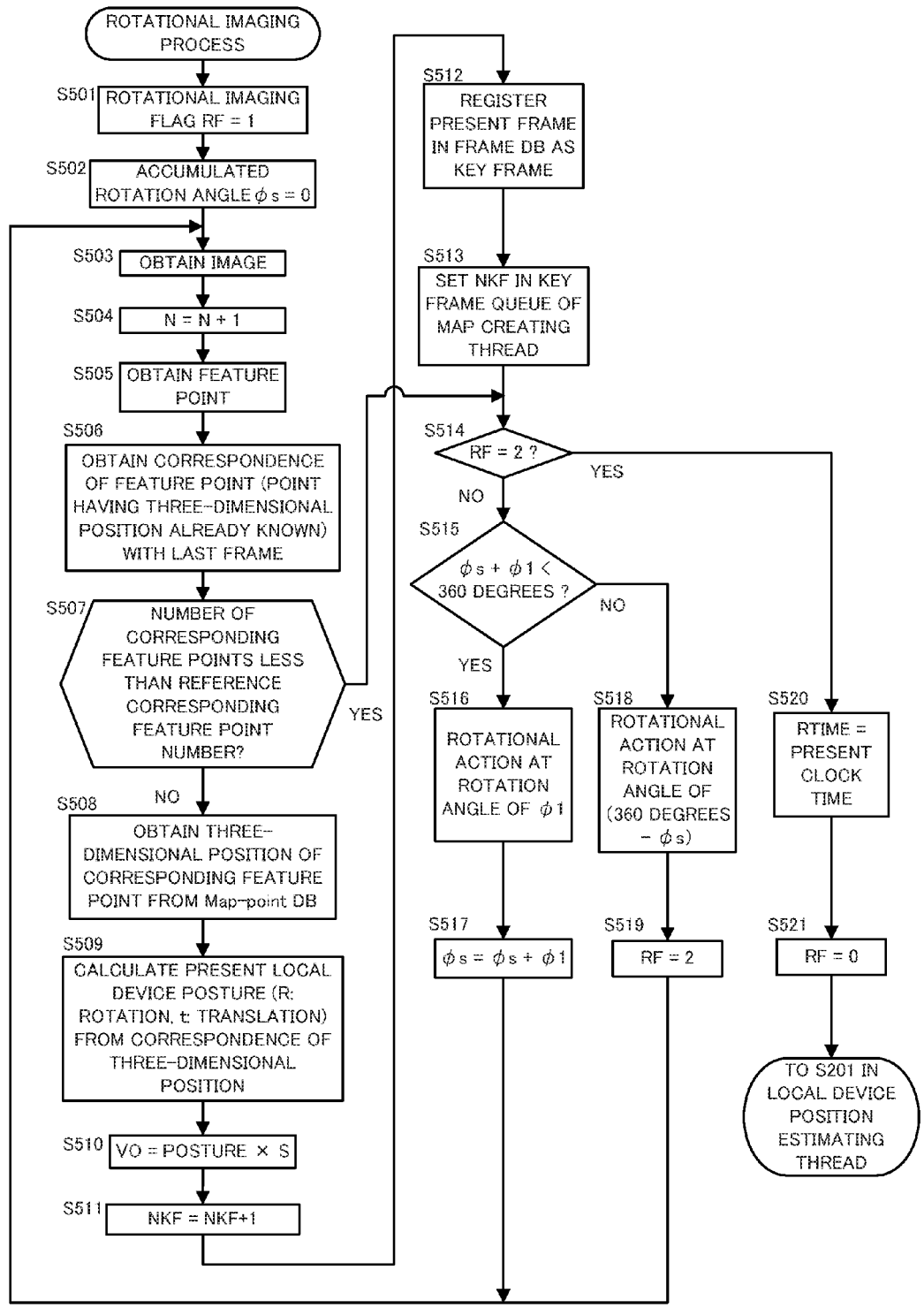
FIG. 7 is a flowchart for a rotational imaging process in the autonomous movement control process according to the first embodiment.
Figure 14:
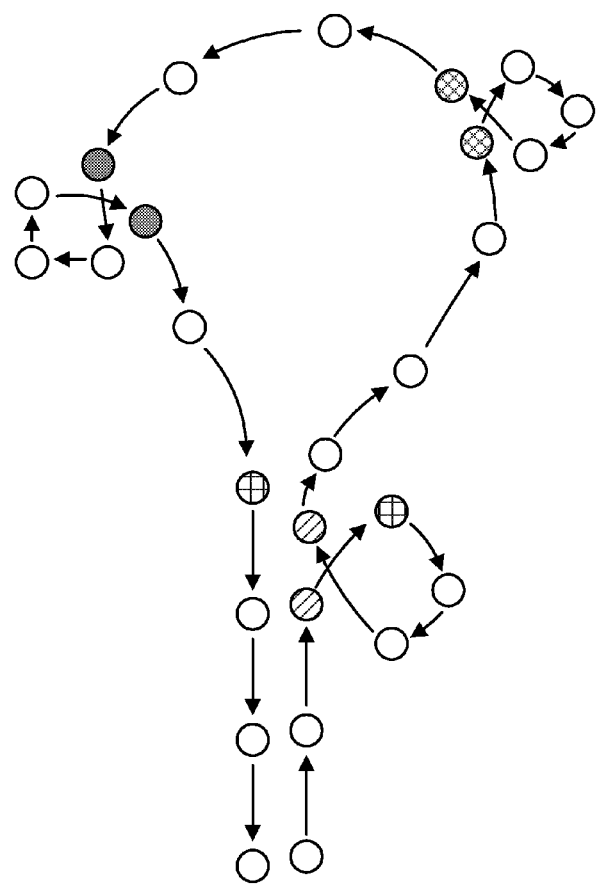
FIG. 14 is a diagram for explaining the rotational imaging process of the first embodiment which enables the loop closing process.

Next, an explanation will be given of the rotational imaging process that is a process detail in step S233 of the flowchart (see FIG. 4) in the local device position estimating thread launched in the step S101 of the main flow (see FIG. 3) for the autonomous movement device 100 with reference to FIG. 7. This is a process of causing the image picker 41 to pick up an image while rotating the local device by the driver 42, and storing the picked-up image in the image memory 21 associated with the information on the position of the local device and the direction thereof. By executing this rotational imaging process, as illustrated in FIG. 14, the number of key frames at points that have near positions and similar directions increases. Since such key frames contain a large number of consistent feature points, the loop closing process is enabled, and by executing this rotational imaging process at a fixed interval, the loop closing is executed at the fixed interval.

First, as the initializing process for the rotational imaging process, the rotational image picker 11 sets (step S501) the rotational imaging flag RF to 1, and clears out (step S502) the accumulated rotation angle $\phi_s$.

Next, the rotational image picker 11 causes the image picker 41 to pick up (step S503) an image, and increments (step S504) the frame counter N. Subsequently, the rotational image picker 11 obtains (step S505) the two-dimensional feature point contained in the picked-up image. Next, from the information on the past key frame (for example, an image that has the key frame number of NKF) registered in the frame database, the rotational image picker 11 obtains (step S506) the two-dimensional feature point that has the known three-dimensional position (the Map point registered in the Map-point database) among the two-dimensional feature points contained in such information on the image, and extracts the two-dimensional feature point (a corresponding feature point) that has the correspondence with the presently picked-up image.

Subsequently, the position estimator 13 determines (step S507) whether or not the number of corresponding feature points is less than the reference corresponding point number, and when the number of corresponding feature points is less than the reference corresponding point number (step S507: YES), since the precision of the estimated posture by the SLAM scheme decreases, the position estimator 13 progresses the process to step S514 without estimating the position. In this case, instead of immediate progress to the step S514, the process may be returned to the step S506 to search the key frame that has the number of corresponding feature points which is equal to or greater than the reference corresponding feature point number among the key frames registered in the frame database. In this case, when the key frame that has the number of corresponding feature points which is equal to or greater than the reference corresponding feature point number is not found among the key frames registered in the frame database, the process progresses to the step S514.

When the corresponding feature points that are equal to or greater than the reference corresponding feature point number are extracted (step S507: NO), the rotational image picker 11 obtains (step S508) the respective three-dimensional positions ($X_i$, $Y_i$, $Z_i$) of the corresponding feature points from the Map-point database, executes the similar calculation to that of the step S227 in the local device position estimating thread, thereby obtaining (step S509) the posture (the position of the local device and the direction thereof indicated by the translation vector t and the rotational matrix R) of the local device in the SLAM coordinate system.

Next, the rotational image picker 11 multiplies the obtained result by the scale S to obtain (step S510) the Visual Odometry (VO), increments (step S511) the key frame counter NKF, and registers (step S512) the present frame as the key frame in the frame DB. Subsequently, in order to inform the map creating thread of a creation of the new key frame, the rotational image picker 11 sets (step S513) the key frame counter NKF in the key frame queue of the map creating thread.

Next, the rotational image picker 11 determines (step S514) whether or not the rotational imaging flag RF is set to 2. When the rotational imaging flag RF is set to 2 (step S514: YES), the present clock time is set in RTIME (step S520), the rotational imaging flag RF is cleared out (step S521), and the process returns to the step S201 in the local device position estimating thread. When the rotational imaging flag RF is not 2 (step S514: NO), the rotational image picker 11 progresses the process to step S515, and determines (step S515) whether or not the accumulated rotation angle $\phi_s$+the rotation angle $\phi_1$ is less than 360 degrees. In this case, the rotation angle $\phi_1$ is a rotation angle by what corresponds to a single rotational action in the rotational imaging process, and is, for example, 30 degrees. $\phi_1$ is preferably set to an angle equal to or less than the half of the view angle of the image picker 41.

When the accumulated rotation angle $\phi_s$+the rotation angle $\phi_1$ is less than 360 degrees (step S515: YES), the rotational image picker 11 instructs (step S516) the driver 42 to perform a rotational action at the rotation angle $\phi_1$, adds (step S517) the rotation angle $\phi_1$ to the accumulated rotation angle $\phi_s$, and returns the process to the step S503. The rotational action in this case is desirably a rotational action that has no positional displacement if a rotation while remaining at the same position is possible by, for example, turning the two wheels of the driver 42 in the opposite directions at the same speed. When the two wheels are capable of turning in the same direction only, a rotational action that has a rotational radius as small as possible is desirable.

When the accumulated rotation angle $\phi_s$+the rotation angle $\phi_1$ is equal to or greater than 360 degrees (step S515: NO), the rotational image picker 11 instructs (step S518) the driver 42 to perform a rotational action at a rotation angle of (360 degrees–$\phi_s$), sets (step S519) the rotational imaging flag RF to 2, and returns the process to the step S503.

When the driver 42 is capable of performing the rotational action that has no positional displacement, in the step S509, the rotational matrix R is obtainable based on a presumption that the translation vector t is unchanged.

In the above first embodiment, although the rotational image picker 11 executes the process to perform an action "when the predetermined time (DTIME) has elapsed", but as a modified example, the rotational image picker 11 may perform the action "when a movement equal to or greater than a predetermined distance (for example, the reference translation distance) is made". In this case, instead of RTIME, Rt (a variable to set the position (the translation vector) where the rotational imaging process started last time) may be applied, the process at the step S219 in FIG. 4 is not "RTIME=present clock time" but "Rt=present translation vector t", the process at the step S220 in FIG. 4 is not "present clock time<RTIME+DTIME" but "distance between present translation vector t and Rt<predetermined distance", and the process at the step S520 in FIG. 7 is not "RTIME=present clock time" but "Rt=translation vector t with key frame number NKF". This actuates the rotational image picker 11 every time a movement by the predetermined distance is made.

As explained above, according to the first embodiment, every time the predetermined time has elapsed, at the fixed interval, the rotational image picker 11 picks up an image while performing a rotational action, and in the modified example of the first embodiment, every time the movement by the predetermined distance is made, at the fixed interval, the rotational image picker 11 picks up an image while performing a rotational action. Such an action of the rotational image picker 11 increases the information on the image in the image memory 21 subjected to the search by the similar image searcher 14.

Figure 8:
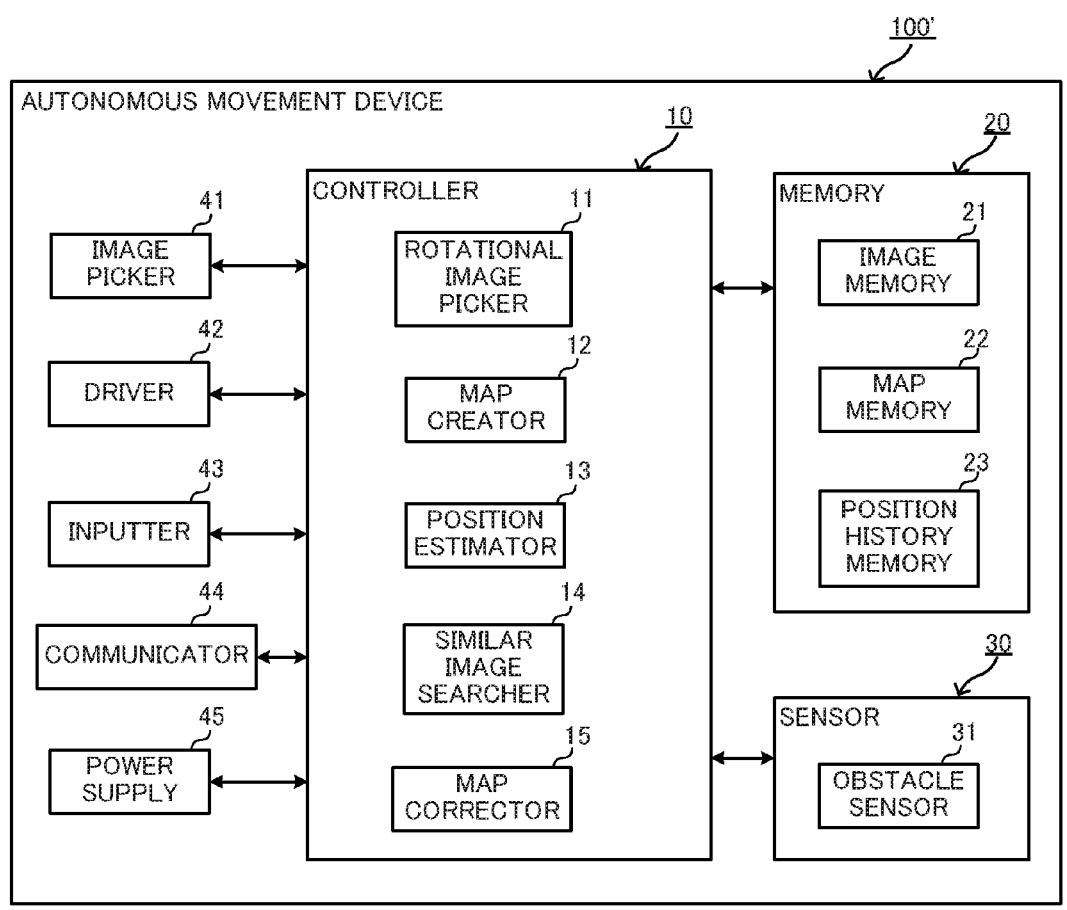
FIG. 8 is a diagram illustrating a structure of an autonomous movement device according to a second embodiment.

As a second embodiment, an explanation will be given of an embodiment in which the rotational imaging process is executed when the autonomous movement device 100 comes to a near position to the position where the autonomous movement device 100 came in past in view of the Euclidean distance. According to an autonomous movement device 100' of this embodiment, as illustrated in FIG. 8, a distance determiner 16 is added to the controller 10 of the first embodiment, and a position history memory 23 is added to the memory 20. The distance determiner 16 determines whether or not a distance between the present position of the autonomous movement device 100' and the past position thereof is equal to or greater than a predetermined distance. The position history memory 23 stores the estimated position (the translation vector t) by the position estimator 13 together with a time stamp (a key frame counter). Instead of adding the individual position history memory 23, the image memory 21 may be also considerable as originally containing the position history memory 23 (this is because the information on the "posture" stored in the frame DB in the image memory 21 contains information on the "position" (the translation vector t when a position history is stored) to be stored in the position history memory 23).

Figure 9:
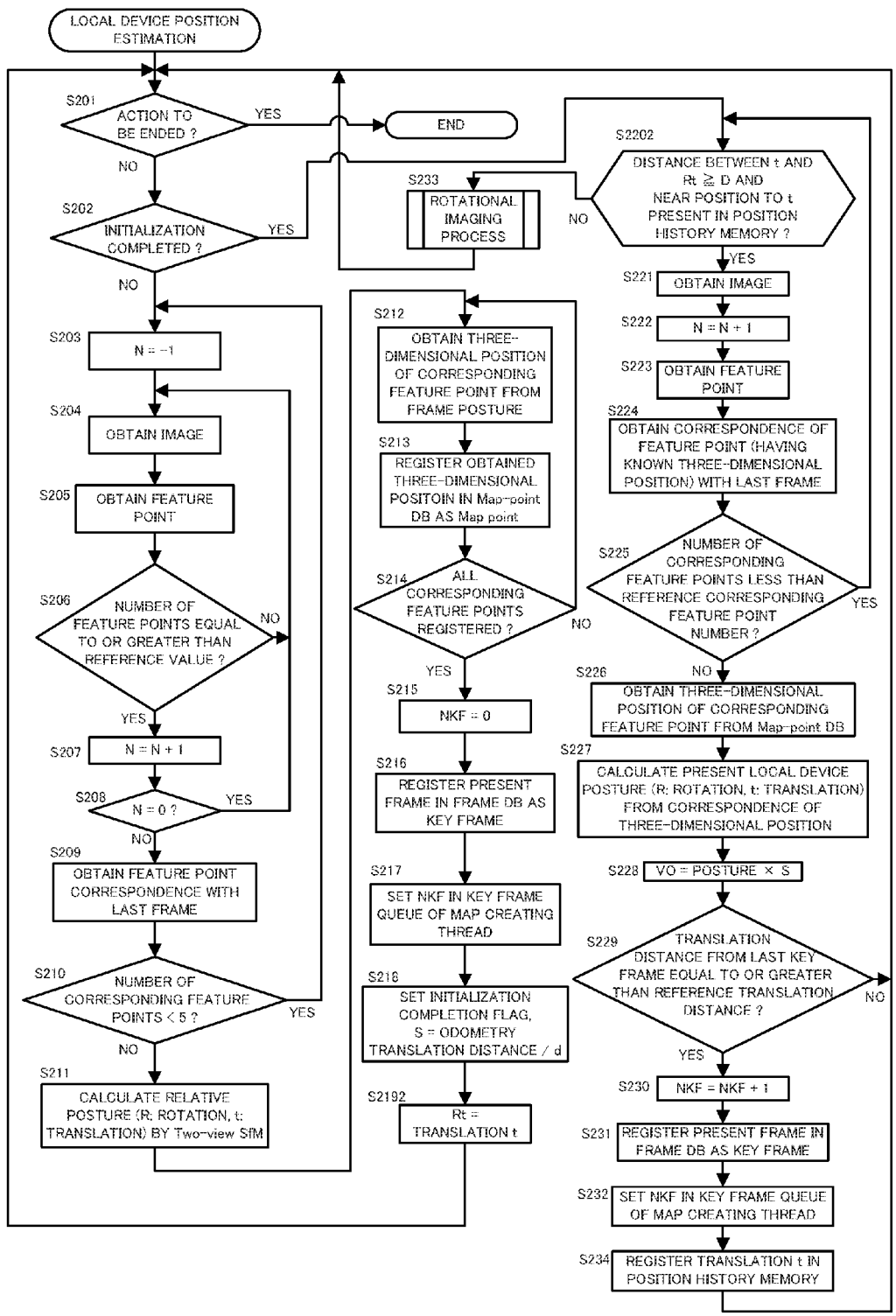
FIG. 9 is a flowchart for a process in a local device position estimating thread of the autonomous movement control process according to the second embodiment.

The flowchart for the entire autonomous movement process in the second embodiment is common to that of the first embodiment, and is shown in FIG. 3. The flowchart for the local device position estimating thread in the second embodiment is shown in FIG. 9. Many portions in this flowchart are common to those in FIG. 4 that is the flowchart for the local device position estimating thread according to the first embodiment. Hence, only the difference will be explained below.

In step S2192, the controller 10 sets the present translation vector t in Rt. In step S2202, the distance determiner 16 determines whether or not the distance between the present translation vector t and Rt is equal to or greater than a predetermined distance D (a variable representing the predetermined distance (reference distance), for example, the reference translation distance is set), and whether or not, in the position history memory 23, a position (the translation vector t when the position history is stored) that matches the present translation vector t by equal to or greater than a predetermined similarity level (hereinafter, referred to as a "reference position similarity level", for example, 0.9) is stored (the position similarity level is obtainable by calculating the inner product of the respective absolute values (square root of sum of squares) of the translation vectors to be compared which are normalized to 1). When, instead of adding the individual position history memory 23, and the frame DB in the image memory 21 is also utilized as the position history memory 23, a determination is made on whether or not, in the respective postures of the key frames in the frame DB, a position (the translation vector t when the key frame is registered) that matches the present translation vector by equal to or greater than the reference position similarity level is stored.

When the present translation vector t is apart from Rt by equal to or greater than D, and the matching position by equal to or greater than the reference position similarity level is stored in the position history memory 23 (or the frame DB) (step S2202: YES), the process progresses to the step S233, and returns to the step S201 after the rotational imaging process is executed. When the distance from Rt is less than the reference distance D, or when a matching position by equal to or greater than the reference position similarity level is not stored in the position history memory 23 (or the frame DB) (step S2202: NO), the process progresses to step S221.

In the step S234, the position estimator 13 registers, in the position history memory 23, the present position (the translation vector t) together with the time stamp. The positions that have been registered up to this time point may be checked prior to the registration, and when the same position (or the matching position by equal to or greater than the predetermined reference position similarity level) has been already registered, the registration may be omitted. This saves the memory area in the position history memory 23. In addition, when, instead of adding the individual position history memory 23, and the frame DB in the image memory 21 is also utilized as the position history memory 23, the step S234 can be omitted.

Figure 5:
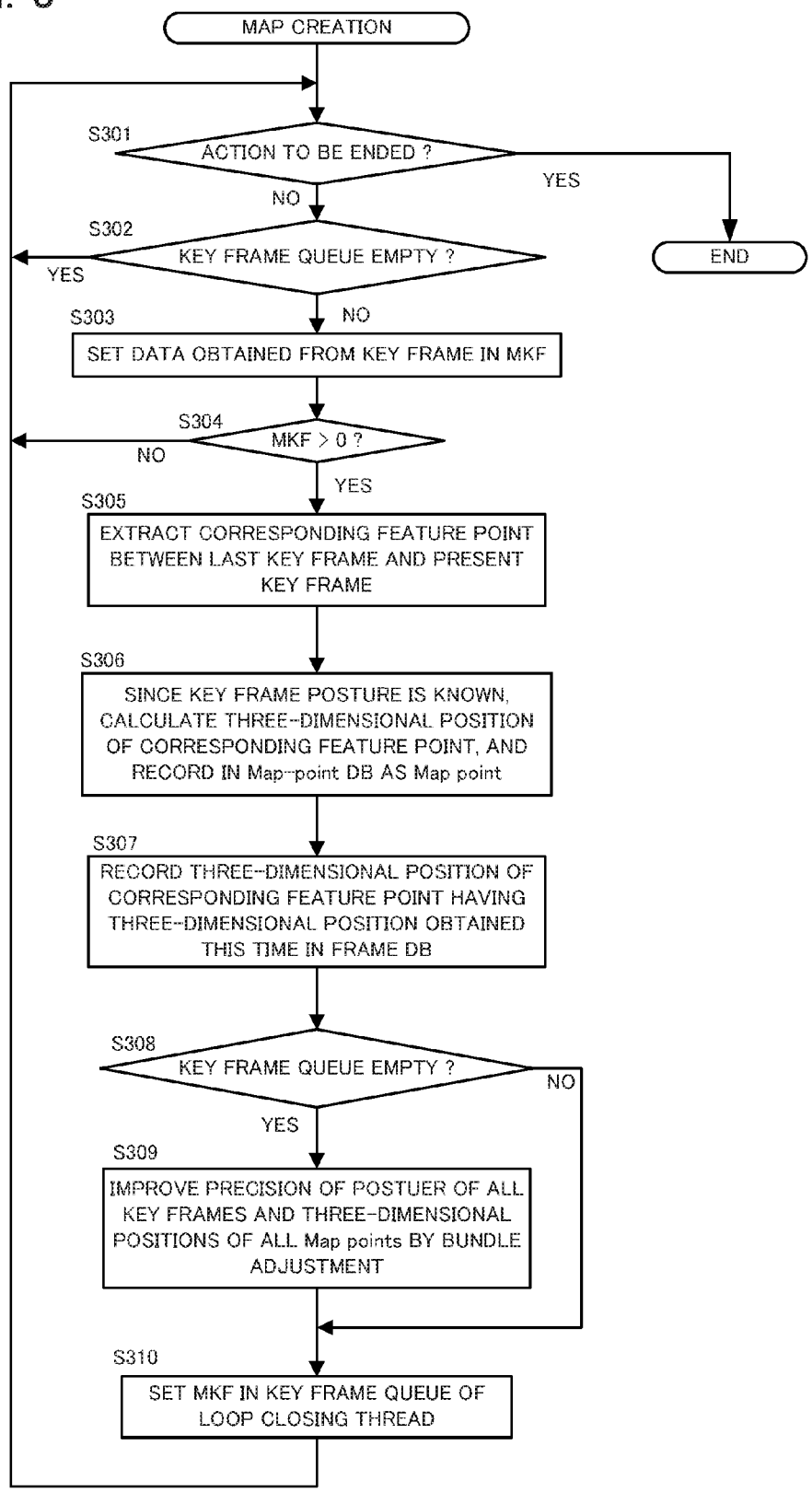
FIG. 5 is a flowchart for a process in a map creating thread of the autonomous movement control process according to the first embodiment.

The map creating thread in the second embodiment is common to that of the first embodiment, and is illustrated in FIG. 5. The loop closing thread in the second embodiment is also common to that of the first embodiment, and is illustrated in FIG. 6. The rotational imaging process in the second embodiment is similar to that of the first embodiment illustrated in FIG. 7, but only differs therefrom that the process at the step S520 in FIG. 7 is not "RTIME=present time" but "the translation vector t with the key frame number NKF is set in Rt".

By executing such a process, according to the second embodiment, the rotational imaging process is executed only when the autonomous movement device 100 comes to a near position to the position where the autonomous movement device 100 came in past in view of the Euclidean distance, and thus the efficient rotational imaging process is executed upon a selection of a time point at which the loop closing process is highly possibly to be executed. Note that in the above explanation, although in the process at the step S2202, a determination on "whether or not the matching position to the present translation vector t by equal to or greater than the predetermined reference position similarity level is stored in the position history memory 23" is made by the distance determiner 16, but a determination on "whether or not a position that has a distance from the present translation vector t which is less than a predetermined distance (for example, "5 cm" or "1/10 of the reference translation distance" which is a quite smaller value than D) is stored in the position history memory 23" may be made (the same is true in the following modified example to be explained later).

In addition, as the modified example of the second embodiment, a third condition may be further added in which "the condition at the step S2202 in FIG. 9 is "when the distance between the present translation vector t and Rt is equal to or greater than the reference distance D, the matching position to the present translation vector t by equal to or greater than the reference position similarity level is stored in the position history memory 23, and there is no key frame similar to the present frame by equal to or greater than a reference image similarity level in the frame DB".

When there is a key frame similar to the present frame by equal to or greater than a reference image similarity level in the frame DB, the loop closing process is highly possibly executed in the loop closing thread without execution of the rotational imaging process. Hence, according to this modified example, by eliminating the execution of the rotational imaging process in such a case, the number of executions of the rotational imaging process is further reduced in comparison with the above second embodiment.

Figure 10:
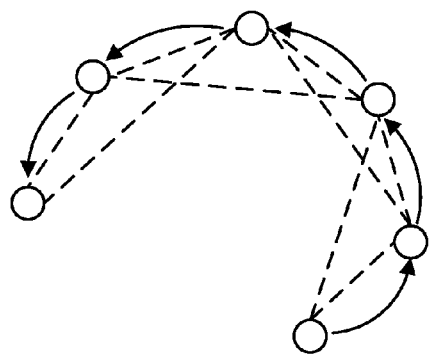
FIG. 10 is a diagram for explaining a co-visibility graph.
Figure 15:
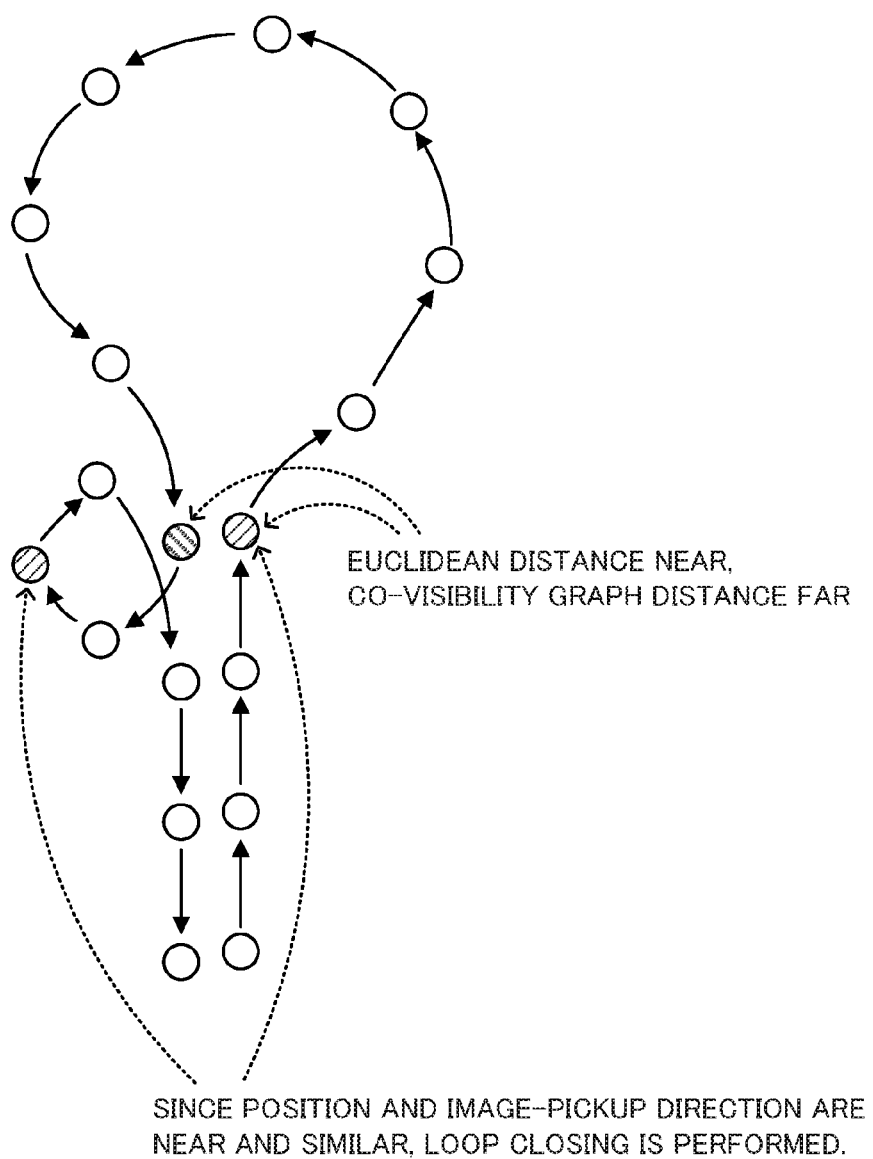
FIG. 15 is a diagram for explaining the rotational imaging process of the third embodiment which enables the loop closing process.

As a third embodiment, an explanation will be given of an embodiment in which the rotational imaging process is executed when the autonomous movement device 100 comes to a near position to the position where the autonomous movement device 100 came in past in view of the Euclidean distance but a distant position in view of a co-visibility graph. First, an explanation will be given of the co-visibility graph. As illustrated in FIG. 10, the co-visibility graph is a graph that interconnects "key frames that have the relative positional relationship directly calculatable like including multiple common Map points (the feature points that have the three-dimensional positions already obtained) by lines. When the autonomous movement device 100 is unable to reach by tracing the line by at least n times between the two key frames, the co-visibility graph distance between those key frames is n. Between the key frames that have a large co-visibility graph distance, the error by what corresponds to this distance is accumulated in the SLAM estimation, and thus the error in the relative position becomes. According to the third embodiment, as illustrated in FIG. 15, the rotational imaging process is executed when the autonomous movement device 100 comes to a near position to the position where the autonomous movement device 100 came in past in view of the Euclidean distance but a distant position in view of a co-visibility graph. This enables an obtainment of a key frame that has the near position and the similar imaging direction, enabling the loop closing.

The third embodiment has a large number of common features to the second embodiment. The only difference is that "when the co-visibility graph distance from the matching position by equal to or greater than the reference position similarity level is equal to or greater than the predetermined value n" is added to the AND condition at the step S2202 in FIG. 9, and the other process portions and structures are the same as those of the second embodiment.

In this case, the condition at the step S2202 in FIG. 9 becomes "when the distance between the present translation vector t and Rt is equal to or greater than the reference distance D, the matching position to the present translation vector t by equal to or greater than the reference position similarity level is stored in the position history memory 23, and the co-visibility graph distance from the matching position by equal to or greater than the reference position similarity level is equal to or greater than the predetermined value".

How to obtain the co-visibility graph distance will be explained. First, by extracting a set of key frames that have the relative positional relationship to the key frame K directly calculatable (more simply, "a set of key frames that have the image similarity level to the key frame K which is equal to or greater than the reference image similarity level") with reference to the frame DB, the extracted result becomes "a key frame set that has the co-visibility graph distance relative to the key frame K which is 1". In addition, by extracting, for each key frame contained in "the key frame set that has the co-visibility graph distance relative to the key frame K which is i", a set of key frames that have the relative positional relationship to this key frame directly calculatable (more simply, "a set of key frames that have the image similarity level to this key frame which is equal to or greater than the reference image similarity level") with reference to the frame DB, this extraction result becomes "a key frame set that has the co-visibility graph distance relative to the key frame K which is i+1". In this key frame set extracting process, the similar image searcher 14 executes a process corresponding to a relative-position calculation possibility determiner.

When key frames K and L are given, in order to obtain the co-visibility graph distance between K and L, in accordance with the above explained scheme, first, "the key frame set that has the co-visibility graph distance relative to the key frame K which is 1" is created. Next, when L is not contained in "the key frame set that has the co-visibility graph distance relative to the key frame K which is i", the process of creating "the key frame set that has the co-visibility graph distance relative to the key frame K which is i+1" is repeated until "L is contained in the key frame set that has the co-visibility graph distance relative to the key frame K which is i+1". When the key frame set that contains L is obtained, "i+1" at this time point becomes the co-visibility graph distance between K and L. In this co-visibility graph distance calculating process, the controller 10 executes a process corresponding to a co-visibility graph distance calculator.

In the step S2202, there is the second determination condition on "whether or not the matching position to the present translation vector t by equal to or greater than the reference position similarity level is stored in the position history memory 23". When this condition is satisfied, and when the key frame corresponding to this position (the key frame that has the key frame number which is the value of the time stamp (the key frame counter) when the position is registered in the position history memory 23) is extracted with reference to the frame DB, and is taken as the key frame K, as for the determination on "whether or not the co-visibility graph distance relative to the matching position equal to or greater than the reference position similarity level is equal to or greater than the predetermined value n", as explained above, "the key frame set that has the co-visibility graph distance relative to the key frame K which is 1" to "the key frame set that has the co-visibility graph distance relative to the key frame K which is i+1" are created, and when the key frame K is not contained in those key frame sets, a determination that "the co-visibility graph distance relative to the matching position equal to or greater than the reference position similarity level is equal to or greater than the predetermined value n" can be made.

When there is a key frame that has the near co-visibility graph distance, the error accumulation may be considerable as not so large. Hence, by executing the rotational imaging process only when the co-visibility graph distance is equal to or greater than the predetermined value, the rotational imaging process is executed only when the error is accumulated by equal to or greater than a predetermined value, reducing the number of executions of the rotational imaging process.

In the embodiments explained above, by the rotational imaging process, images picked up in various directions are registered as the key frames in the frame DB. This facilitates the similar key frame to be found in the subsequent loop closing thread. Consequently, the frequency of map correction increases, and thus the accumulated error in the local device position, and the like, is reduced.

Up to this paragraph, the explanation has been given of an example case in which the frequency of executing the loop closing thread is increased by increasing the key frames registered in the frame DB, but there is also another scheme of decreasing the reference image similarity level when the similar image searcher 14 searches, at the step S405 in the loop closing thread, the similar image (in this case, the loop closing process is to be executed even if the similarity is not so high).

However, when the reference image similarity level is simply reduced, the possibility that the loop closing process is executed at an inadequate position (irrelevant to the location where the autonomous movement device 100 came in past) increases. Hence, a process of decreasing the reference image similarity level only when the present local device position estimated by the position estimator 13 has a distance relative to the position of the key frame subjected to the comparison by the similar image searcher 14 which is equal to or shorter than the reference distance is executed. This will be explained below as a fourth embodiment.

Figure 11:
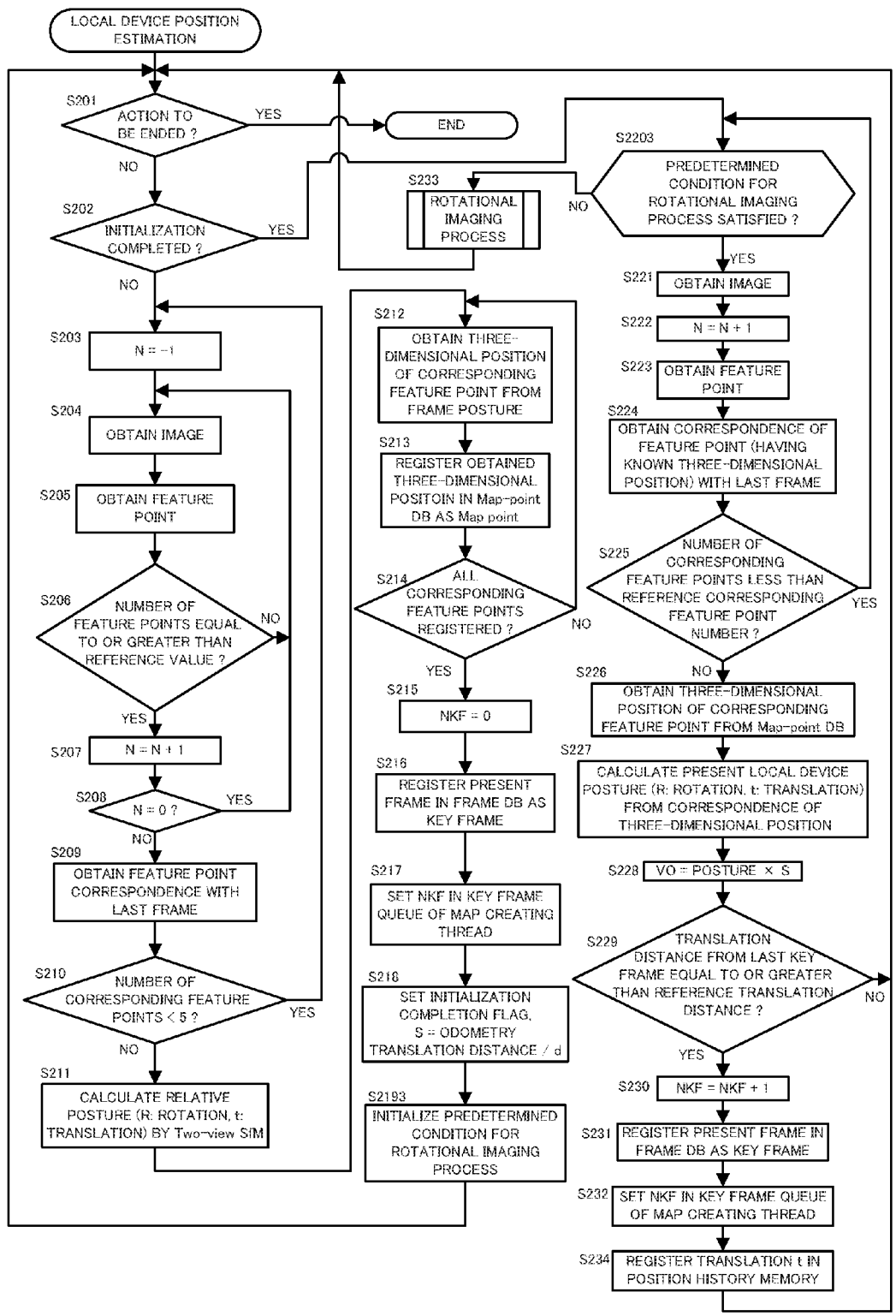
FIG. 11 is a flowchart for a process in a local device position estimating thread of the autonomous movement control process according to a fourth embodiment.

The fourth embodiment employs the common structure as that of the second embodiment which is illustrated in FIG. 8. The flowchart for the entire autonomous movement process according to the fourth embodiment is common to that of the first embodiment which is shown in FIG. 3. The flowchart for the local device position estimating thread according to the fourth embodiment is shown in FIG. 11. Since many portions are common to those of FIG. 4 that is the flowchart for the local device position estimating thread in the first embodiment, only the difference will be explained below.

In step S2193, the initialization of the predetermined condition for the rotation imaging process is executed. For example, the controller 10 sets the present translation vector t in Rt. According to the fourth embodiment, since the rotational imaging process is not always necessary, when the rotational imaging process is not executed, this step S2193 may be omitted.

In step S2203, the controller 10 determines whether or not the predetermined condition for the rotational imaging process is satisfied. When the predetermined condition is satisfied (step S2203: YES), the controller 10 progresses the process to the step S233 to execute the rotational imaging process, and returns the process to the step S201. When the predetermined condition is not satisfied (step S2203: NO), the controller 10 progresses the process to the step S221. According to the fourth embodiment, when the rotational imaging process is not executed, this step S2203 may also be omitted, and in this case, the controller 10 progresses the process to the step S221 without a condition determination.

Since the step S234 is consistent with the step S234 in FIG. 9 that is a flowchart for the local device position estimating thread in the second embodiment, the explanation will be omitted.

The map creating thread in the fourth embodiment is common to that of the first embodiment, and is illustrated in FIG. 5. The rotational imaging process in the fourth embodiment is similar to that of the first embodiment illustrated in FIG. 7, but differs only therefrom that the process at the step S520 in FIG. 7 is not "RTIME=present time" but "initialization of the predetermined condition for the rotational imaging process". When the rotational imaging process is not executed in the fourth embodiment, the entire process in FIG. 7 may be omitted.

Figure 6:
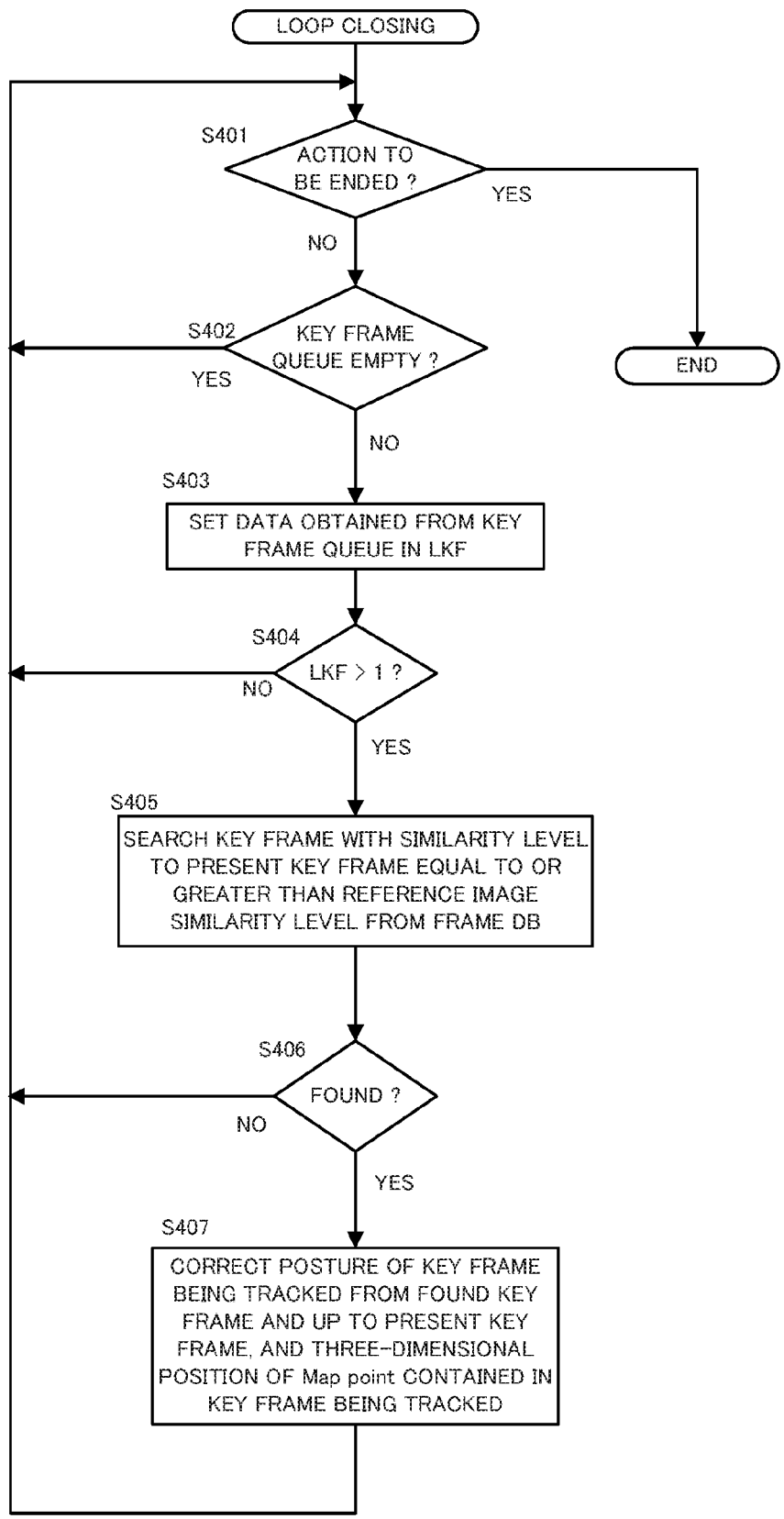
FIG. 6 is a flowchart for a process in a loop closing thread of the autonomous movement control process according to the first embodiment.
Figure 12:
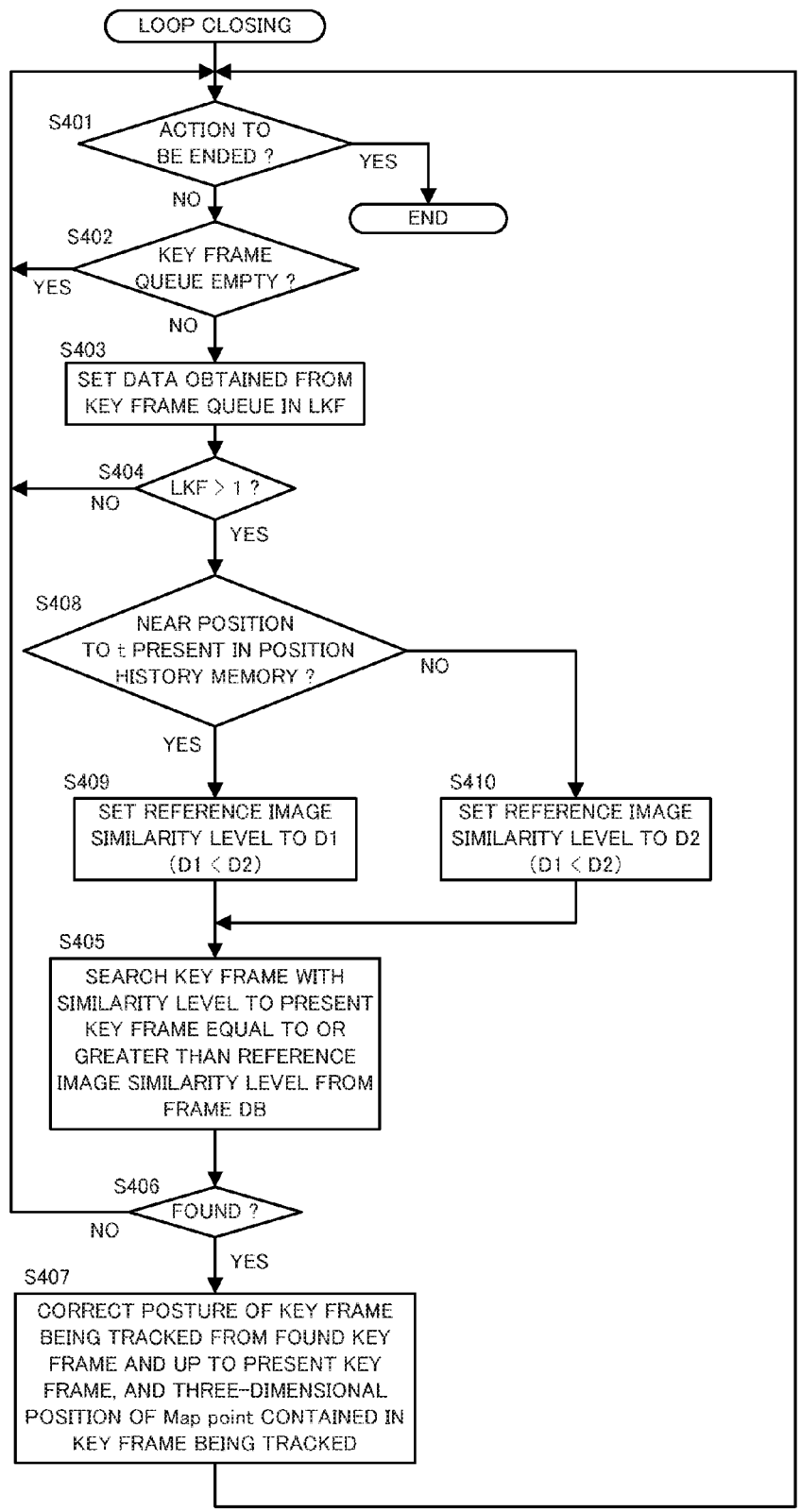
FIG. 12 is a flowchart for a process in a loop closing thread of the autonomous movement control process according to the fourth embodiment.
Figure 13:
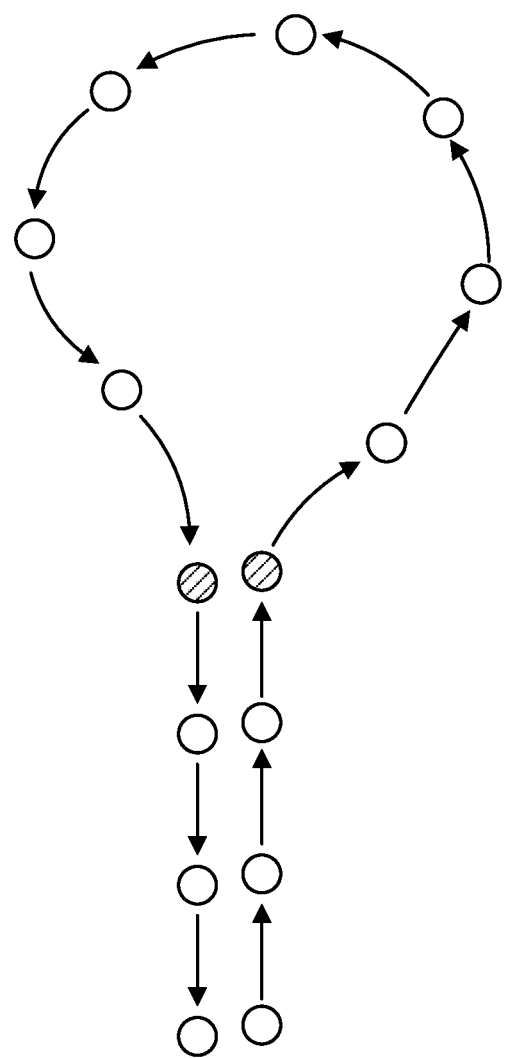
FIG. 13 is a diagram for explaining an example movement that does not enable the loop closing process.

The loop closing thread in the fourth embodiment partially differs from the loop closing thread of the first embodiment illustrated in FIG. 6, and as illustrated in FIG. 12, respective steps S408-S410 are added between the step S404 and the step S405. In the step S408, the controller 10 determines whether or not a position that has a matching level in position relative to the present key frame (the key frame that has the key frame number LKF) which is equal to or greater than the reference position similarity level (the position that has a distance which is between the local device position when the present key frame is picked up and the position stored in the position history memory 23 is equal to or shorter than a predetermined value) is stored in the position history memory 23.

When such a position is stored in the position history memory 23 (step S408: YES), the value of reference image similarity level that is D1 is applied (step S409), and when such a position is not stored in the position history memory 23 (step S408: NO), the value of the reference image similarity level that is D2 is applied (step S410). In this case, D1 and D2 satisfy a condition D1<D2. That is, when the autonomous movement device 100 comes to a near position to the position where the autonomous movement device 100 came in past (step S408: YES), the reference image similarity level is set to be a smaller value than the normal value (D2). This enables the similar image to be found in the search at the step S405 even if the similarity level is slightly small (=D1), enabling the execution of the loop closing process in the step S407.

When the determination result in the step S408 is YES, the autonomous movement device 100 is often located at a near position to the position where the autonomous movement device 100 came in past. Under this circumstance, when a similar image is not found from the frame DB, the imaging direction may differ from the past direction. In this case, by setting the reference image similarity level to be a smaller value than the normal value, the similar image can be found even if the imaging direction is slightly different, enabling the execution of the loop closing process.

This fourth embodiment differs from the first to third embodiments, and is realizable without a rotational imaging process. Hence, the explanation has been given of an example case in which the rotational imaging process may be omitted. When, however, the rotational imaging process is executed simultaneously with the fourth embodiment, the loop closing process can be further surly executed.

According to the fourth embodiment in which the rotational imaging process is not executed, the image picker 41 that has a wide view angle is desirably applied. When, in particular, the image picker 41 that has a view angle of equal to or greater than 180 degrees (most desirably, the image picker 41 that includes a fish-eye lens which has a view angle of 360 degrees) is applied, once the autonomous movement device 100 comes to a position where the autonomous movement device 100 came in past, the common feature point is often picked up regardless of the direction. Hence, the loop closing process is often enabled even if the threshold for the image similarity level determination is decreased.

Note that in the above embodiment, the value of the reference translation distance is set to, for example, "1 m", but the optimized reference translation distance changes in accordance with the size of het autonomous movement device itself and the speed thereof, the environment in which the autonomous movement device 100 moves, the movement range, and the like. Accordingly, how to set the reference translation distance will be supplementary explained below.

As the setting scheme of the reference translation distance, such a reference translation distance may be set in accordance with a ratio between the average value (=an average distance of the depths up to all Map points observed in the key frame) of the distance from the three-dimensional positions of all Map points (the two-dimensional feature points that have the known three-dimensional position) over the key frame and to the local device, and, the translation distance (for example, the distance that is 5% of the average distance of the depths up to the Map points is set as the reference translation distance). "All Map points" applied in this case are extractable by the controller 10 that refers to the Map-point DB, and the controller 10 in this process executes a process corresponding to a position estimatable feature point extractor. In addition, when, for example, the autonomous movement device 100 moves on a surface of a table, the reference translation distance may be set to 10 cm, when the autonomous movement device 100 moves on a floor of a room, the reference translation distance may be set to 1 m, and when the autonomous movement device 100 moves around an outdoor open space, the reference translation distance may be set to 10 m, in accordance with the translation distance in the actual environment. Alternatively, the value in accordance with the wheel diameter of the driver 42 (for example, 10 times as much as the wheel diameter) may be set as the reference translation distance.

When the reference translation distance is set in accordance with the distance in the actual environment, as for the translation distance in the SLAM coordinate system, a conversion to the distance in the actual environment by multiplication of the scale S is executed for the comparison (the same is true in the opposite case, and when the distance in the SLAM coordinate system is set as the reference translation distance, the distance in the actual environment is divided by the scale S so as to be converted into the distance in the SLAM coordinate system for the comparison).

Note that the respective functions of the autonomous movement device 100 (100') according to the present disclosure are realizable by a general computer like a Personal Computer (PC). More specifically, in the above embodiment, the explanation has been given of an example case in which the program for the autonomous movement control process executed by the autonomous movement device 100 is stored in the ROM of the memory 20 beforehand. However, the program may be distributed in a manner recorded in a non-transitory computer-readable recording medium, such as a flexible disk, a Compact Disc Read Only Memory (CD-ROM), a Digital Versatile Disc (DVD), or a Magneto-Optical disc (MO), and may be read and installed in a computer to accomplish the computer that realizes the respective functions explained above.

Figure 16:
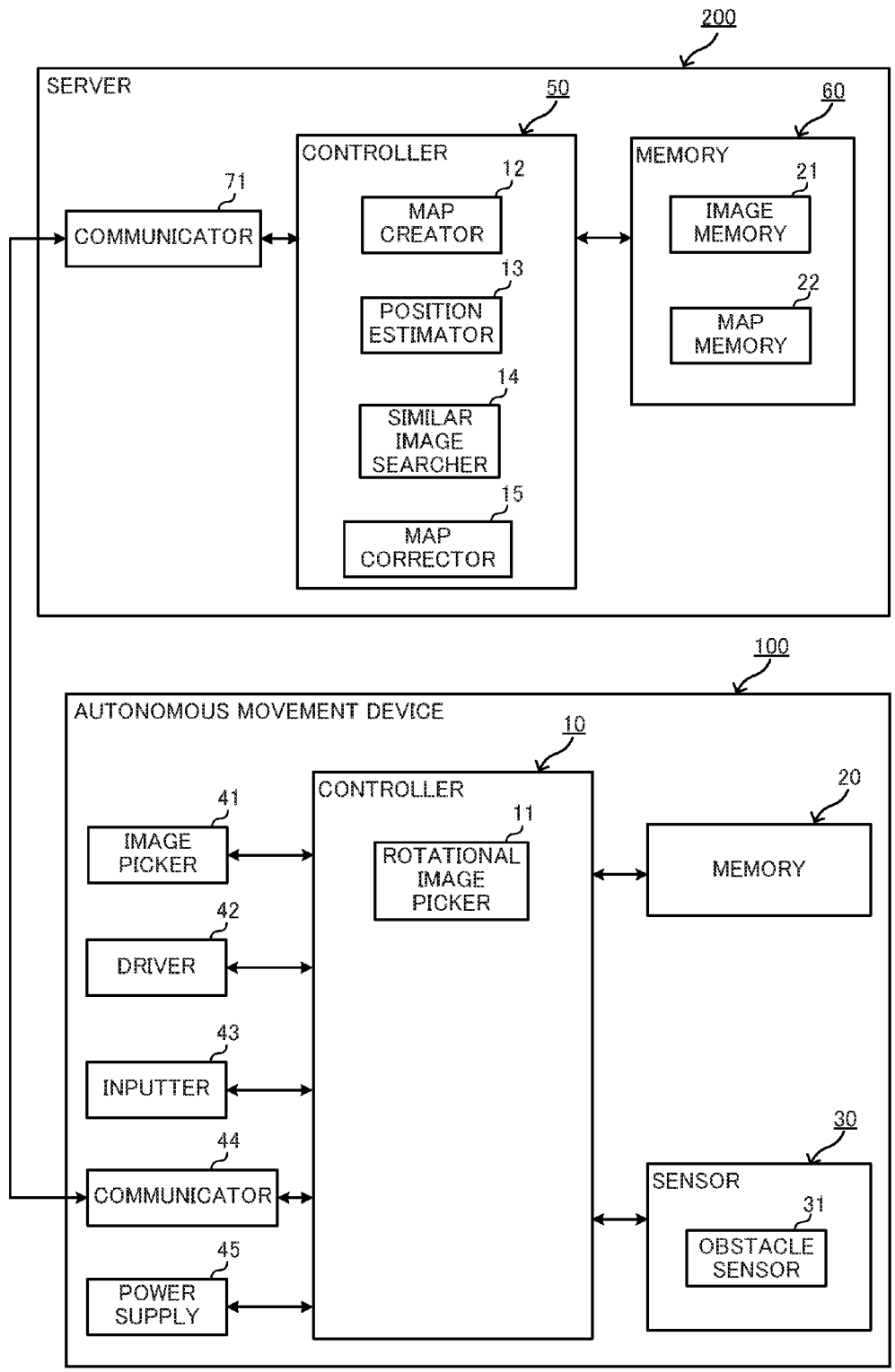
FIG. 16 is a diagram illustrating an example structure in which a component like a controller is provided in an external server.

In addition, this computer may be built in the autonomous movement device 100 or may be an individual apparatus from the autonomous movement device 100. That is, as illustrated in FIG. 16, the controller, the memory, and the like may be provided in an external server 200. In accordance with a cloud-computing technology, the controller 10 of the autonomous movement device 100 may transmit data obtained by the image picker 41, the sensor 30, and the like to the external server 200 via the communicator 44, cause the external server 200 to execute arithmetic processing, receive the arithmetic process result by the external server 200 via the communicator 44, and control the driver 42 and the like. In FIG. 16, a controller 50 of the external server 200 includes the map creator 12, the position estimator 13, the similar image searcher 14, and the map corrector 15, and the controller 10 of the autonomous movement device 100 includes the rotational image picker 11. However, either the controller 50 of the external server 200 or the controller 10 of the autonomous movement device 100 may include the respective components. Which one of either the controller 50 of the external server 200 or the controller 10 of the autonomous movement device 100 may include the respective components is a design option that may be addressed as appropriate.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An autonomous movement device for performing movement while creating a map, the autonomous movement device comprising:
    an image picker including a camera;
    a driver including a motor;
    a controller including a processor; and
    a memory which stores the map, which is created using information on a plurality of stored images picked up by the image picker,
    wherein the controller is configured to:
        cause the image picker to pick up an image while causing the driver to rotate the autonomous movement device;
        store, in the memory, information on the image picked up by the image picker in association with information on a position of the autonomous movement device when the image is picked up;
        search, from among the plurality of stored images in the memory, for an image that has a similarity level to the picked-up image equal to or greater than a predetermined similarity level;
        determine, when the image that has the similarity level equal to or greater than the predetermined similarity level is found, that the autonomous movement device has returned to a site recognized as a site where the autonomous movement device has traveled to in the past;
        correct the map stored in the memory using information indicating a position expressed by coordinates on the map, corresponding to the found image stored in the memory; and
        control the driver to move the autonomous movement device based on the corrected map.

2. The autonomous movement device according to claim 1, further comprising a communicator that communicates with an external server,
    wherein at least one of the following actions of the controller is executed by the external server: the storing of the information on the image in the memory; the search for the image; and the correction of the map.

3. The autonomous movement device according to claim 1, wherein the controller causes the image picker to pick up the image while causing the driver to rotate the autonomous movement device at fixed intervals.

4. The autonomous movement device according to claim 3, wherein the controller causes the image picker to pick up the image while causing the driver to rotate the autonomous movement device every time a predetermined time has elapsed.

5. The autonomous movement device according to claim 3, wherein the controller causes the image picker to pick up the image while causing the driver to rotate the autonomous movement device every time the autonomous movement device moves by a predetermined distance.

6. The autonomous movement device according to claim 1, wherein the controller stores, in the memory, the information on the picked-up image every time the autonomous movement device moves by a reference translation distance.

7. The autonomous movement device according to claim 6, wherein a value obtained by multiplying a diameter of a wheel of the driver by a predetermined value is set as the reference translation distance.

8. The autonomous movement device according to claim 1, wherein when the controller determines that the autonomous movement device has returned to a site recognized as a site where the autonomous movement device once traveled in the past, the controller corrects the map stored in the memory using a translation vector t and a rotation matrix R indicating a position of the autonomous movement device expressed by coordinates on the map, and using a translation vector t and a rotation matrix R indicating a current position of the autonomous movement device.

9. An autonomous movement device for performing movement while creating a map, the autonomous movement device comprising:
   an image picker including a camera;
   a driver including a motor;
   a controller including a processor; and
   a memory which stores the map, which is created using information on a plurality of stored images picked up by the image picker,
   wherein the controller is configured to:
      cause the image picker to pick up an image while causing the driver to rotate the autonomous movement device;
      store, in the memory, information on the image picked up by the image picker in association with information on a position of the autonomous movement device when the image is picked up;
      search, from among the plurality of stored images in the memory, for an image that has a similarity level to the picked-up image equal to or greater than a predetermined similarity level;
      correct the map stored in the memory based on, when the image that has the similarity level of equal to or greater than the predetermined similarity level is found, information on a position corresponding to the found image; and
      control the driver to move the autonomous movement device based on the corrected map;
   wherein the controller is further configured to:
      estimate the position of the autonomous movement device;
      store, in the memory, an estimated position history; and
      determine whether or not a past position that has a distance relative to a present position equal to or shorter than a predetermined distance is stored in the memory, and cause the image picker to pick up the image while causing the driver to rotate the autonomous movement device when determining that the past position is stored in the memory.

10. The autonomous movement device according to claim 9, wherein when determining that the past position is stored in the memory, and when the image that has the similarity level equal to or greater than the predetermined similarity level is not found through the search, the controller causes the image picker to pick up the image while causing the driver to rotate the autonomous movement device.

11. The autonomous movement device according to claim 9, wherein the controller:
   further executes a relative position calculation possibility determination to determine whether or not a relative positional relationship between the two image-pickup positions is directly calculatable;
   calculates a co-visibility graph distance by calculating, through the relative position calculation possibility determination, at least how many images stored in the memory are necessary to enable the calculation of the relative positional relationship between a given position and the present position; and
   when determining that the past position is stored in the memory, and when the calculated co-visibility graph distance between the past position and the present position is equal to or greater than a predetermined value, causes the image picker to pick up the image while causing the driver to rotate the autonomous movement device.

12. An autonomous movement device for performing movement while creating a map, the autonomous movement device comprising:
   an image picker including a camera;
   a driver including a motor;
   a controller including a processor; and
   a memory which stores the map, which is created using information on a plurality of stored images picked up by the image picker,
   wherein the controller is configured to:
      cause the image picker to pick up an image while causing the driver to rotate the autonomous movement device;
      store, in the memory, information on the image picked up by the image picker in association with information on a position of the autonomous movement device when the image is picked up;
      search, from among the plurality of stored images in the memory, for an image that has a similarity level to the picked-up image equal to or greater than a predetermined similarity level;
      correct the map stored in the memory based on, when the image that has the similarity level of equal to or greater than the predetermined similarity level is found, information on a position corresponding to the found image; and
      control the driver to move the autonomous movement device based on the corrected map; and
   wherein the controller is further configured to:
      estimate the position of the autonomous movement device;
      store, in the memory, an estimated position history; and
      determine whether or not a past position that has a distance relative to a present position equal to or shorter than a predetermined distance is stored in the memory, and decrease the predetermined similarity level by a predetermined value when determining that the past position is stored in the memory.

13. An autonomous movement device for performing movement while creating a map, the autonomous movement device comprising:

an image picker including a camera;
a driver including a motor;
a controller including a processor; and
a memory which stores the map, which is created using information on a plurality of stored images picked up by the image picker,
wherein the controller is configured to:
  cause the image picker to pick up an image while causing the driver to rotate the autonomous movement device;
  store, in the memory, information on the image picked up by the image picker in association with information on a position of the autonomous movement device when the image is picked up;
  search, from among the plurality of stored images in the memory, for an image that has a similarity level to the picked-up image equal to or greater than a predetermined similarity level;
  correct the map stored in the memory based on, when the image that has the similarity level of equal to or greater than the predetermined similarity level is found, information on a position corresponding to the found image; and
  control the driver to move the autonomous movement device based on the corrected map;
wherein the controller stores, in the memory, the information on the picked-up image every time the autonomous movement device moves by a reference translation distance; and
wherein the controller is further configured to extract a feature position with an estimatable position from the plurality of images, and set, as the reference translation distance, a value obtained by dividing an average value of a distance between the position of the autonomous movement device and each position of all of the extracted feature points by a predetermined value.

14. A method for controlling an autonomous movement device that performs movement while creating a map, the autonomous movement device comprising: an image picker including a camera, a driver including a motor, and a memory which stores the map which is created using information on a plurality of stored images picked up by the image picker, the method comprising:
  causing the image picker to pick up an image while causing the driver to rotate the autonomous movement device;
  storing, in the memory, information on the image picked up by the image picker in association with information on a position of the autonomous movement device when the image is picked up;
  searching, from among the plurality of stored images in the memory, for an image that has a similarity level to the picked-up image equal to or greater than a predetermined similarity level;
  determining, when the image that has the similarity level equal to or greater than the predetermined similarity level is found, that the autonomous movement device has returned to a site recognized as a site where the autonomous movement device has traveled to in the past;
  correcting the map stored in the memory using information indicating a position expressed by coordinates on the map, corresponding to the found image stored in the memory; and
  controlling the driver to move the autonomous movement device based on the corrected map.

15. A non-transitory computer-readable medium having stored thereon a program that is executable by a computer that controls an autonomous movement device which movement while creating a map, the autonomous movement device comprising: an image picker including a camera, a driver including a motor, and a memory which stores the map which is created using information on a plurality of stored images picked up by the image picker, the program being executable by the computer to cause the computer to perform functions comprising:
  causing the image picker to pick up an image while causing the driver to rotate the autonomous movement device;
  storing, in the memory, information on the image picked up by the image picker in association with information on a position of the autonomous movement device when the image is picked up;
  searching, from among the plurality of stored images in the memory, for an image that has a similarity level to the picked-up image equal to or greater than a predetermined similarity level;
  determining, when the image that has the similarity level equal to or greater than the predetermined similarity level is found, that the autonomous movement device has returned to a site recognized as a site where the autonomous movement device has traveled to in the past;
  correcting the map stored in the memory using information indicating a position expressed by coordinates on the map, corresponding to the found image stored in the memory; and
  controlling the driver to move the autonomous movement device based on the corrected map.

* * * * *